(12) United States Patent
Kang et al.

(10) Patent No.: US 12,380,442 B2
(45) Date of Patent: Aug. 5, 2025

(54) ADDRESS GENERATION METHOD, BLOCKCHAIN INFORMATION PROCESSING METHOD, AND RELATED DEVICE

(71) Applicant: HUAWEI TECHNOLOGIES CO., LTD., Guangdong (CN)

(72) Inventors: Xin Kang, Singapore (SG); Yanjiang Yang, Singapore (SG); Haiguang Wang, Singapore (SG)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 292 days.

(21) Appl. No.: 18/308,786

(22) Filed: Apr. 28, 2023

(65) Prior Publication Data
US 2023/0259926 A1 Aug. 17, 2023

Related U.S. Application Data

(63) Continuation of application No. PCT/CN2021/126962, filed on Oct. 28, 2021.

(30) Foreign Application Priority Data

Oct. 31, 2020 (CN) .......................... 202011196897.1

(51) Int. Cl.
*G06Q 20/38* (2012.01)
*G06Q 20/02* (2012.01)
(Continued)

(52) U.S. Cl.
CPC ......... *G06Q 20/3829* (2013.01); *G06Q 20/02* (2013.01); *G06Q 20/3827* (2013.01);
(Continued)

(58) Field of Classification Search
CPC ....... H04L 9/50; H04L 9/0841; H04L 9/0861; G06Q 20/3829; G06Q 20/02; G06Q 20/3827
(Continued)

(56) References Cited

U.S. PATENT DOCUMENTS 10,373,158 B1 * 8/2019 James ..................... G06Q 40/04
10,540,654 B1 * 1/2020 James .................. G06Q 20/223
(Continued)

FOREIGN PATENT DOCUMENTS

CN 109274652 A 1/2019
CN 109285073 A 1/2019
(Continued)

OTHER PUBLICATIONS

Kopp Henning et al: "Cryptographic Design of PriCloud, a Privacy-Preserving Decentralized Storage with Remuneration", IEEE Transactions on Dependable and Secure Computing, IEEE Service Center. New York. NY. US vol. 18, No. 4, Sep. 19, 2019 (Sep. 19, 2019), pp. 1908-1919, 12 pages, XP011865452.
(Continued)

*Primary Examiner* — Teshome Hailu

(57) ABSTRACT

Embodiments of this disclosure disclose an address generation method which includes: a first blockchain node generates a shared key based on a private key of a first blockchain node and a first public key of a second blockchain node, generates a temporary first public key address of the second blockchain node based on the shared key and first transaction content, and writes first transaction information into a blockchain, where the first transaction information includes a public key address of the first blockchain node, the first public key address, and first transaction content between the first blockchain node and the second blockchain node; and the first public key address needs to be verified by using the (Continued)

shared key, and a recipient may also generate the shared key by using a public key of the first blockchain node and a first private key of the second blockchain node, to verify the transaction information.

12 Claims, 10 Drawing Sheets

(51) Int. Cl.
    *H04L 9/00*           (2022.01)
    *H04L 9/08*           (2006.01)

(52) U.S. Cl.
    CPC .......... *H04L 9/0841* (2013.01); *H04L 9/0861* (2013.01); *H04L 9/50* (2022.05)

(58) Field of Classification Search
    USPC ........................................................ 713/162
    See application file for complete search history.

(56) References Cited

U.S. PATENT DOCUMENTS

| | | | | |
|---|---|---|---|---|
| 11,200,569 B1* | 12/2021 | James | ................... | G06Q 20/381 |
| 11,308,487 B1* | 4/2022 | Foster | ................ | G06Q 20/3829 |
| 11,501,370 B1* | 11/2022 | Paya | ................... | G06Q 20/3676 |
| 2015/0356523 A1 | 12/2015 | Madden | | |
| 2017/0154331 A1* | 6/2017 | Voorhees | .............. | H04L 9/3255 |

FOREIGN PATENT DOCUMENTS

| | | |
|---|---|---|
| CN | 110519059 A | 11/2019 |
| CN | 111241586 A | 6/2020 |
| WO | 2020024995 A1 | 2/2020 |

OTHER PUBLICATIONS

Chapter 12: Key Establishment Protocols ED—Menezes A J; Van Oorschot P C: Vanstone S A, Handbook of Applied Cryptography; [CRC Press Series on Discrete Mathematices and Its Applications], CRC Press, Boca Raton, FL, US, pp. 489-541, Oct. 1, 1996 (Oct. 10, 1996), 54 pages, XP001525012.

N/a N/a: "Introduction", Jan. 1, 2019 (Jan. 1, 2019), pp. 1-30, XP055771456, Retrieved from the Internet: URL: https://vergecurrency.com/static/blackpaper/verge-blackpaper-v5.0.pdf, 30 pages.

Extended European Search Report for Application No. 21885245.7 dated Feb. 27, 2024, 10 pages.

Chinese Office Action for Application No. 202011196897 dated May 18, 2023, 12 pages.

\* cited by examiner

ADDRESS GENERATION METHOD, BLOCKCHAIN INFORMATION PROCESSING METHOD, AND RELATED DEVICE

CROSS-REFERENCE TO RELATED APPLICATIONS

This disclosure is a continuation of International Application No. PCT/CN2021/126962, filed on Oct. 28, 2021, which claims priority to Chinese Patent Application No. 202011196897.1, filed on Oct. 31, 2020. The disclosures of the aforementioned applications are hereby incorporated by reference in their entireties.

TECHNICAL FIELD

This disclosure relates to the field of computer technologies, and in particular, to an address generation method, a blockchain information processing method, and a related device.

BACKGROUND

A blockchain is essentially a decentralized database. The blockchain relies on cryptography and mathematically ingenious distributed algorithms to enable participants to reach consensus on the Internet where trust relationships cannot be established without intervention of any third-party center. This resolves the problem of reliable transmission of trust and value at a very low cost. The distributed identity and data management platform based on the blockchain is a development trend of the future digital world.

Although the blockchain is highly trusted because of openness, transparency, and tamper-proof features, privacy has become the most concerned issue due to openness and transparency of the blockchain. For example, for a blockchain-based supply chain application, transaction content disclosed on the blockchain involves both parties to the transaction and involves commodity information, and the information is sensitive. A manufacturer does not want others to know retailers of the manufacturer, and a retailer does not want others to know customers of the retailer.

To resolve the foregoing problem, a recipient of a commodity may use a new public key address in each transaction process. In this way, from a perspective of a third party, it is impossible to associate a plurality of public key addresses with one person, and therefore privacy protection is achieved. However, the recipient needs to store and manage a plurality of public-private key pairs, which increases management difficulty.

SUMMARY

Embodiments of this disclosure provide an address generation method, a blockchain information processing method, and a related device. A shared key used for verification may also be generated by using a public key of a first blockchain node and a first private key of a second blockchain node. That is, a recipient may also generate the shared key to verify transaction information. The recipient does not need to store or manage a plurality of public-private key pairs, which simplifies management.

To resolve the foregoing technical problem, embodiments of this disclosure provide the following technical solutions.

According to a first aspect, an embodiment of this disclosure provides an address generation method, which may be used in the blockchain field. The method includes: a first blockchain node generates a shared key based on a private key of a first blockchain node and a first public key of a second blockchain node, where the private key of the first blockchain node is a fixed key of the first blockchain node, and the first public key of the second blockchain node is a fixed key of the second blockchain node. The first blockchain node generates a temporary first public key address of the second blockchain node based on the shared key and first transaction content, where because the first public key address is used only when the first blockchain node sends first transaction information to the second blockchain node, the first public key address is referred to as a temporary public key address, or may be referred to as a one-time public key address. The first blockchain node writes the first transaction information into a blockchain, that is, the first blockchain node adds the first transaction information to the blockchain, where the first transaction information includes a public key address (that is, a public key address of a transaction sender) of the first blockchain node, the first public key address (that is, a public key address of a transaction recipient), and the first transaction content, where the first transaction content is content of a current transaction between the first blockchain node and the second blockchain node, and the first transaction content includes a timestamp indicating a time of the transaction indicated by the first transaction content. If the transaction indicated by the first transaction content is created by the first blockchain node, regardless of whether the first blockchain node has one set of fixed keys or two sets of fixed keys, the public key address of the first blockchain node is generated based on a long-term public key of the first blockchain node. If the transaction indicated by the first transaction content is transferred by a third blockchain node to the first blockchain node, similar to the first public key address, the public key address of the first blockchain node is a temporary public key address generated by the third blockchain node for the first blockchain node. The first transaction information written into the blockchain is verified by the second blockchain node based on the first public key address, the first public key address needs to be verified by using the shared key, and the shared key is generated by the second blockchain node by using the public key of the first blockchain node and the first private key of the second blockchain node.

In this implementation, because the public key address of the first transaction information is generated based on the shared key and the first transaction content, and transaction content varies with different transactions, the public key address of each piece of transaction information on the blockchain is one-time, privacy of a recipient can be well protected. In addition, the shared key may alternatively be generated by using the public key of the first blockchain node and the first private key of the second blockchain node. That is, the recipient may generate the shared key, and generate the public key address of the first transaction information based on the shared key and the first transaction content, to verify the transaction information. The recipient does not need to store or manage a plurality of public-private key pairs, thereby simplifying management.

In a possible implementation of the first aspect, that the first blockchain node generates the first public key address of first transaction information based on the shared key and the first transaction content includes: the first blockchain node generates a temporary second private key based on the shared key and the first transaction content. Because transaction content corresponding to different transactions is different, private keys generated based on different transaction content are different. Therefore, the second private key is one-time, that is, the second private key is temporary rather than fixed. It should be noted that the second private key is a key generated in a process of generating the one-time public key address of the second blockchain node, does not belong to the first blockchain node or the second blockchain node, and does not need to be used to decrypt any transaction information. The first blockchain node generates a temporary third public key based on the second private key and the second public key of the second blockchain node, and generates a temporary first public key address of the second blockchain node based on the temporary third public key. It should be noted that the third public key and the second private key have similar functions, and both are keys generated in the process of generating the one-time public key address of the second blockchain node; and neither of the keys belongs to the first blockchain node or the second blockchain node, and neither of the keys needs to be used to decrypt any transaction information. Regardless of whether the second blockchain node has one set of fixed keys or two sets of fixed keys, the second public key of the second blockchain node is a long-term public key of the second blockchain node.

In this embodiment of this disclosure, if the first public key address is generated based on the second private key and the second public key of the second blockchain node, the third private key of the second blockchain node needs to be used to generate a private key used to spend a product in the first transaction information. Therefore, after transferring the product in the first transaction information to the second blockchain node, the first blockchain node can still spend the product in the first transaction information, thereby ensuring security of the property of the second blockchain node and stability of transactions on the blockchain.

In a possible implementation of the first aspect, that the first blockchain node generates the second private key based on the shared key and the first transaction content includes: the first blockchain node combines the shared key and the first transaction content to obtain a first combination result, and perform a hash operation on the first combination result to generate the second private key. A combination manner includes but is not limited to concatenation, exclusive OR operation, addition, or the like; and a used hash function includes but is not limited to SHA256, SHA512, or another hash function. In this embodiment of this disclosure, a specific implementation of generating the second private key is provided, which is simple in operation and easy to implement.

In a possible implementation of the first aspect, that the first blockchain node generates the first public key address based on the second private key and the second public key of the second blockchain node includes: the first blockchain node generates a temporary third public key based on the temporary second private key and the second public key of the second blockchain node in an elliptic curve public key cryptosystem, and generates the temporary first public key address based on the temporary third public key under the constraint of the elliptic curve public key cryptosystem; or the first blockchain node generates a temporary third public key based on the temporary second private key and the second public key of the second blockchain node in a discrete logarithm public key cryptosystem, and generates, under the constraint of the discrete logarithm public key cryptosystem, the temporary first public key address based on the temporary third public key.

In this embodiment of this disclosure, in both the elliptic curve public key cryptosystem and the discrete logarithm public key cryptosystem, the temporary third public key can be generated based on the temporary second private key and the second public key of the second blockchain node, and the temporary first public key address can be generated based on the temporary third public key, thereby extending an application scenario of this solution.

In a possible implementation of the first aspect, that the first blockchain node generates a temporary third public key based on the temporary second private key and the second public key of the second blockchain node in an elliptic curve public key cryptosystem includes: the first blockchain node performs dot product multiplication on the temporary second private key r and a generator G (that is, a generator of an elliptic curve group) based on a temporary second private key r, to generate the temporary public key R, and then adds the temporary public key R to the second public key B of the second blockchain node, to generate the temporary third public key T, that is, the temporary third public key $T=R+B$.

In a possible implementation of the first aspect, that the first blockchain node generates a temporary third public key based on the temporary second private key and the second public key of the second blockchain node in an elliptic curve public key cryptosystem includes: the first blockchain node performs dot product multiplication on the temporary second private key r and a generator G (that is, a generator of an elliptic curve group) based on the temporary second private key r, to generate the temporary public key R, and then subtracts the second public key B of the second blockchain node from the temporary public key R, to generate the temporary third public key T, that is, the temporary third public key $T=R-B$.

In a possible implementation of the first aspect, that the first blockchain node generates a temporary third public key based on the temporary second private key and the second public key of the second blockchain node in an elliptic curve public key cryptosystem includes: the first blockchain node multiplies the temporary second private key r by the second public key B of the second blockchain node based on the temporary second private key r, to generate the temporary third public key T, that is, the temporary third public key $T=r \cdot B$.

In a possible implementation of the first aspect, that the first blockchain node generates a temporary third public key based on the temporary second private key and the second public key of the second blockchain node in an elliptic curve public key cryptosystem includes: the first blockchain node multiplies a reciprocal of the temporary second private key r by the second public key B of the second blockchain node based on the temporary second private key r, to generate the temporary third public key T.

In a possible implementation of the first aspect, that the first blockchain node generates a temporary third public key based on the temporary second private key and the second public key of the second blockchain node in a discrete logarithm public key cryptosystem includes: the first blockchain node performs an exponential operation on the temporary second private key r and the second public key B of the second blockchain node based on the temporary second private key r, to generate the temporary third public key T, where the second public key B of the second blockchain node is a base in the exponential operation, and the temporary second private key r is an exponent in the exponential operation.

In a possible implementation of the first aspect, that a first blockchain node generates a shared key based on a private key of a first blockchain node and a first public key of a second blockchain node includes either of the following two operations: the first blockchain node performs dot product multiplication on the private key of the first blockchain node and the first public key of the second blockchain node in an elliptic curve public key cryptosystem, to obtain the shared key; or the first blockchain node performs an exponential operation based on the private key of the first blockchain node and the first public key of the second blockchain node in a discrete logarithm public key cryptosystem, to obtain the shared key, where the first public key of the second blockchain node is a base in the exponential operation, and the private key of the first blockchain node is an exponent in the exponential operation.

In the embodiments of this disclosure, the manners of generating the shared key in the elliptic curve public key cryptosystem and the discrete logarithm public key cryptosystem are separately disclosed, thereby extending an application scenario of this solution.

In a possible implementation of the first aspect, both the first blockchain node and the second blockchain node have only one set of fixed keys, the set of fixed keys includes one long-term private key and one long-term public key, the private key of the first blockchain node is the long-term private key of the first blockchain node, the first public key of the second blockchain node is the long-term public key of the second blockchain node, the public key of the first blockchain node is the long-term public key of the first blockchain node, and the first private key of the second blockchain node is the long-term private key of the second blockchain node; or both the first blockchain node and the second blockchain node have two sets of fixed keys, the two sets of fixed keys include a first set of fixed keys and a second set of fixed keys, the first set of fixed keys includes one long-term private key and one long-term public key, the second set of fixed keys includes one scanning private key and one scanning public key, the private key of the first blockchain node is the long-term private key of the first blockchain node, the first public key of the second blockchain node is the scanning public key of the second blockchain node, the public key of the first blockchain node is the long-term public key of the first blockchain node, and the first private key of the second blockchain node is the scanning private key of the second blockchain node.

In this embodiment of this disclosure, the blockchain information processing method provided may be applied not only to a case in which a blockchain node has only one set of fixed keys, but also to a case in which a blockchain node has two sets of fixed keys, thereby extending an application scenario of this solution.

According to a second aspect, an embodiment of this disclosure provides a blockchain information processing method, which may be used in the blockchain field. The method includes: a second blockchain node generates a shared key based on a public key of a first blockchain node and a first private key of a second blockchain node, where the public key of the first blockchain node is a fixed key of the first blockchain node, and the first private key of the second blockchain node is a fixed key of the second blockchain node. The second blockchain node reads at least one piece of transaction information on a blockchain, and when first transaction information exists in the at least one piece of transaction information, determines that a transaction indicated by first transaction content is a successful transaction. That is, the second blockchain node needs to read each piece of transaction information on the blockchain, to determine whether each piece of the transaction information on the blockchain is the first transaction information. The first transaction information includes a public key address of the first blockchain node, first transaction content, and a first public key address of the second blockchain node; and the public key address of the first blockchain node belongs to the first blockchain node, the first transaction content is content of a transaction between the first blockchain node and the second blockchain node, and the first public key address can be generated based on the shared key and the first transaction content. In this embodiment, in a process of determining whether one piece of transaction information is the first transaction information, after reading one piece of transaction information, the second blockchain node obtains transaction content in the transaction information, and generates a temporary public key address based on the generated shared key and the obtained transaction content. A specific generation manner the same as the manner of generating the temporary first public key address. Then, it is determined whether the first public key address is the same as a public key address of a recipient that is carried in the transaction information. If the first public key address is the same as the public key address of the recipient that is carried in the transaction information, it is considered that the transaction information is the first transaction information; or if the first public key address is different from the public key address of the recipient that is carried in the transaction information, it is considered that the transaction information is not the first transaction information.

In a possible implementation of the second aspect, that a second blockchain node generates a shared key based on a public key of a first blockchain node and a first private key of a second blockchain node includes: the second blockchain node performs dot product multiplication on the public key of the first blockchain node and the first private key of the second blockchain node in an elliptic curve public key cryptosystem, to obtain the shared key; or the second blockchain node performs an exponential operation based on the public key of the first blockchain node and the first private key of the second blockchain node in a discrete logarithm public key cryptosystem, where the public key of the first blockchain node is a base in the exponential operation, and the first private key of the second blockchain node is an exponent in the exponential operation.

In a possible implementation of the second aspect, the method further includes: when the second blockchain node determines that the transaction indicated by the first transaction information is a successful transaction, if the second blockchain node needs to spend a product in the first transaction information, the second blockchain node generates a second private key based on the shared key and the first transaction content, and generates a temporary fourth private key of the second blockchain node based on the second private key and a third private key of the second blockchain node, where the fourth private key is used to spend the product in the first transaction information. The third private key of the second blockchain node is the fixed key of the second blockchain node. Regardless of whether the second blockchain node includes one set of fixed keys or two sets of fixed keys, the third private key of the second blockchain node is a long-term private key of the second blockchain node. In this embodiment of this disclosure, a specific manner of generating the private key of the product in the first transaction information when the second blockchain node needs to spend the product in the first transaction information is provided, thereby extending an application scenario of this solution, and improving integrity of this solution.

In a possible implementation of the second aspect, that the second blockchain node generates the fourth private key of the second blockchain node based on the second private key and the third private key of the second blockchain node includes: the second blockchain node adds, in the elliptic curve public key cryptosystem, the second private key r to the third private key b of the second blockchain node to obtain a first addition result, and performs a modulo operation on the first addition result and an order q of a generator, to obtain the temporary fourth private key of the second blockchain node, that is, the temporary fourth private key $t=(r+b) \mod q$.

In a possible implementation of the second aspect, that the second blockchain node generates the fourth private key of the second blockchain node based on the second private key and the third private key of the second blockchain node includes: the second blockchain node subtracts, in the elliptic curve public key cryptosystem, the third private key b of the second blockchain node from the second private key r to obtain a first subtraction result, and performs a modulo operation on the first subtraction result and the order q of the generator, to obtain the temporary fourth private key of the second blockchain node, that is, the temporary fourth private key $t=(r-b) \mod q$.

In a possible implementation of the second aspect, that the second blockchain node generates the fourth private key of the second blockchain node based on the second private key and the third private key of the second blockchain node includes: the second blockchain node multiplies, in the elliptic curve public key cryptosystem, the second private key r by the third private key b of the second blockchain node, and performs a modulo operation on a multiplication result and the order q of the generator, to obtain the temporary fourth private key of the second blockchain node, that is, the temporary fourth private key $t=(rb) \mod q$.

In a possible implementation of the second aspect, that the second blockchain node generates the fourth private key of the second blockchain node based on the second private key and the third private key of the second blockchain node includes: the second blockchain node multiplies, in the elliptic curve public key cryptosystem, a reciprocal of the second private key r and the third private key b of the second blockchain node based on the temporary second private key, and performs a modulo operation on a multiplication result and the order q of the generator, to obtain the temporary fourth private key of the second blockchain node.

In a possible implementation of the second aspect, that the second blockchain node generates the fourth private key of the second blockchain node based on the second private key and the third private key of the second blockchain node includes: the second blockchain node performs an exponential operation on the temporary second private key r and the third private key b of the second blockchain node in the discrete logarithm public key cryptosystem, to obtain a first operation result, where the third private key b is a base in the exponential operation, and the second private key r is an exponent in the exponential operation; and the second blockchain node performs a modulo operation on the first operation result and the order q of the generator, to obtain the temporary fourth private key of the second blockchain node.

In a possible implementation of the second aspect, both the first blockchain node and the second blockchain node have only one set of fixed keys, the set of fixed keys includes one long-term private key and one long-term public key, the public key of the first blockchain node is the long-term public key of the first blockchain node, and the first private key of the second blockchain node is the long-term private key of the second blockchain node; or both the first blockchain node and the second blockchain node have two sets of fixed keys, the two sets of fixed keys include a first set of fixed keys and a second set of fixed keys, the first set of fixed keys includes one long-term private key and one long-term public key, the second set of fixed keys includes one scanning private key and one scanning public key, the public key of the first blockchain node is the long-term public key of the first blockchain node, and the first private key of the second blockchain node is the scanning private key of the second blockchain node.

For concepts of nouns and specific implementation steps in the second aspect of the embodiments of this disclosure and the possible implementations of the second aspect and beneficial effects brought by each possible implementation, refer to the descriptions in the possible implementations of the first aspect. Details are not described herein again.

According to a third aspect, an embodiment of this disclosure provides an address generation method, which may be used in the blockchain field. The method includes: a first blockchain node generates a shared key based on a private key of the first blockchain node and a first public key of a second blockchain node; the first blockchain node randomly generates a temporary fifth private key, and generates a temporary second public key address of the second blockchain node based on the temporary fifth private key, where the fifth private key is a private key generated in a process of generating a one-time public key address of the second blockchain node, does not belong to the first blockchain node or the second blockchain node, and does not need to be used to decrypt any transaction information, and because the second public key address is used only when the first blockchain node sends second transaction information to the second blockchain node, the second public key address is referred to as a temporary public key address, or may be referred to as a one-time public key address; the first blockchain node performs symmetric encryption on the fifth private key by using the shared key, to obtain the encrypted fifth private key, where symmetric encryption algorithm includes but is not limited to Data Encryption Standard, Triple Data Encryption Standard, Advanced Encryption Standard, or the like; and the first blockchain node writes the second transaction information into the blockchain, where the second transaction information includes a public key address of the first blockchain node (that is, a public key address of a transaction sender), a second public key address (that is, a public key address of a transaction recipient), first transaction content, and the encrypted fifth private key, where the first transaction content is content of a transaction between the first blockchain node and the second blockchain node, the second transaction information written into the blockchain is verified by the second blockchain node based on the second public key address. The second public key is generated based on the fifth private key, the encrypted fifth private key needs to be symmetrically decrypted by using the shared key, and the shared key is generated at the second blockchain node by using the public key of the first blockchain node and the first private key of the second blockchain node.

In this embodiment of this disclosure, another implementation solution in which the transaction recipient does not need to store or manage a plurality of public-private key pairs is provided while ensuring that a real address of the transaction recipient is hidden, thereby improving implementation flexibility of this solution.

In a possible implementation of the third aspect, that a first blockchain node generates a shared key based on a private key of the first blockchain node and a first public key of a second blockchain node includes any one of the following two operations: the first blockchain node performs dot product multiplication on the private key of the first blockchain node and the first public key of the second blockchain node in an elliptic curve public key cryptosystem, to obtain the shared key; or the first blockchain node performs an exponential operation based on the private key of the first blockchain node and the first public key of the second blockchain node in a discrete logarithm public key cryptosystem, where the first public key of the second blockchain node is a base in the exponential operation, and the private key of the first blockchain node is an exponent in the exponential operation.

In a possible implementation of the third aspect, that the first blockchain node generates the second public key address of the second blockchain node based on the fifth private key includes: the first blockchain node generates a temporary fourth private key based on the fifth private key and the second public key of the second blockchain node, and generates the temporary second public key address of the second blockchain node based on the temporary fourth private key. The temporary fourth public key is a key generated in a process of generating the second public key address of the second blockchain node, does not belong to the first blockchain node or the second blockchain node, and does not need to be used to decrypt any transaction information.

For concepts of nouns and specific implementation steps in the third aspect of the embodiments of this disclosure and the possible implementations of the third aspect and beneficial effects brought by each possible implementation, refer to the descriptions in the possible implementations of the first aspect. Details are not described herein again.

According to a fourth aspect, an embodiment of this disclosure provides a blockchain information processing method, which may be used in the blockchain field. The method includes: a second blockchain node generates a shared key based on a public key of a first blockchain node and a first private key of the second blockchain node; and the second blockchain node reads at least one piece of transaction information on a blockchain, and when the second transaction information exists in the at least one piece of transaction information, determines that a transaction indicated by first transaction content is a successful transaction. That is, the second blockchain node needs to read each piece of transaction information on the blockchain, to determine whether each piece of transaction information on the blockchain is the second transaction information. The second transaction information includes a public key address of the first blockchain node, a second public key address of the second blockchain node, the first transaction content, and an encrypted fifth private key. The public key address of the first blockchain node belongs to the first blockchain node, the first transaction content is content of a transaction between the first blockchain node and the second blockchain node, the encrypted fifth private key can be decrypted by using the shared key, and the second public key address can be generated based on the fifth private key. In this embodiment, in a process of determining whether one piece of transaction information is the second transaction information, after reading one piece of transaction information, the second blockchain node decrypts the encrypted key by using the generated shared key; generates a temporary public key address based on a decryption result, where a manner of generating the temporary public key address is the same as a manner of generating a temporary second public key address; and determines whether the generated public key address is the same as a public key address of a transaction recipient that is included in the obtained transaction information. If the generated public key address is the same as the public key address of the transaction recipient that is included in the obtained transaction information it indicates that the read transaction information is the second transaction information; or if the generated public key address is different from the public key address of the transaction recipient that is included in the obtained transaction information, it indicates that the read transaction information is not the second transaction information.

In a possible implementation of the fourth aspect, that a second blockchain node generates a shared key based on a public key of a first blockchain node and a first private key of the second blockchain node includes: the second blockchain node performs dot product multiplication on the public key of the first blockchain node and the first private key of the second blockchain node in an elliptic curve public key cryptosystem, to obtain the shared key; or the second blockchain node performs an exponential operation based on the public key of the first blockchain node and the first private key of the second blockchain node in a discrete logarithm public key cryptosystem, where the public key of the first blockchain node is a base in the exponential operation, and the first private key of the second blockchain node is an exponent in the exponential operation.

In a possible implementation of the fourth aspect, the method further includes: the second blockchain node generates a temporary sixth private key of the second blockchain node based on a temporary fifth private key and a third private key of the second blockchain node, where the sixth private key is used to spend a product in the second transaction information.

For concepts of nouns and specific implementation steps in the fourth aspect of the embodiments of this disclosure and the possible implementations of the fourth aspect and beneficial effects brought by each possible implementation, refer to the descriptions in the possible implementations of the second aspect. Details are not described herein again.

According to a fifth aspect, an embodiment of this disclosure provides an address generation apparatus, which may be used in the blockchain field. The address generation apparatus is applied to a first blockchain node. The apparatus includes: a generation module, configured to generate a shared key based on a private key of the first blockchain node and a first public key of a second blockchain node, where the generation module is further configured to generate a first public key address of the second blockchain node based on the shared key and first transaction content; and a writing module, configured to write first transaction information into a blockchain, where the first transaction information includes a public key address of the first blockchain node, the first public key address, and the first transaction content. The public key address of the first blockchain node belongs to the first blockchain node, the first transaction content is content of a transaction between the first blockchain node and the second blockchain node, the first transaction information written into the blockchain is verified by the second blockchain node based on the first public key address, the first public key address needs to be verified by using the shared key, and the shared key is generated on the second blockchain node by using a public key of the first blockchain node and a first private key of the second blockchain node.

In the fifth aspect of this embodiment of this disclosure, the address generation apparatus may further perform the steps performed by the first blockchain node in the first aspect and the possible implementations of the first aspect. For concepts of nouns and specific implementation steps in the fifth aspect and some possible implementations of the fifth aspect and beneficial effects brought by each possible implementation, refer to the descriptions in the possible implementations of the first aspect. Details are not described herein again.

According to a sixth aspect, an embodiment of this disclosure provides a blockchain information processing apparatus, which may be used in the blockchain field. The blockchain information processing apparatus is applied to a second blockchain node. The apparatus includes: a generation module, configured to generate a shared key based on a public key of a first blockchain node and a first private key of the second blockchain node; a reading module, configured to read at least one piece of transaction information on a blockchain; and a determining module, configured to: when first transaction information exists in the at least one piece of transaction information, determine that a transaction indicated by first transaction content is a successful transaction, where the first transaction information includes a public key address of the first blockchain node, the first transaction content, and a first public key address of the second blockchain node. The public key address of the first blockchain node belongs to the first blockchain node, the first transaction content is content of a transaction between the first blockchain node and the second blockchain node, and the first public key address can be generated based on the shared key and the first transaction content.

In the sixth aspect of the embodiments of this disclosure, the blockchain information processing apparatus may further perform the steps performed by the second blockchain node in the second aspect and the possible implementations of the second aspect. For concepts of nouns and specific implementation steps in the sixth aspect and some possible implementations of the sixth aspect and beneficial effects brought by each possible implementation, refer to the descriptions in the possible implementations of the second aspect. Details are not described herein again.

According to a seventh aspect, an embodiment of this disclosure provides an address generation apparatus, which may be used in the blockchain field. The apparatus is applied to a first blockchain node. The apparatus includes: a generation module, configured to generate a shared key based on a private key of the first blockchain node and a first public key of a second blockchain node, where the generation module is further configured to randomly generate a fifth private key, and generate a second public key address of the second blockchain node based on the fifth private key; an encryption module, configured to perform symmetric encryption on the fifth private key by using the shared key, to obtain the encrypted fifth private key, and a writing module, configured to write second transaction information into a blockchain, where the second transaction information includes a public key address of the first blockchain node, the second public key address, first transaction content, and the encrypted fifth private key. The public key address of the first blockchain node belongs to the first blockchain node, the first transaction content is content of a transaction between the first blockchain node and the second blockchain node, the encrypted fifth private key needs to be decrypted by using the shared key, and the shared key is generated on the second blockchain node by using the public key of the first blockchain node and the first private key of the second blockchain node.

In the seventh aspect of this embodiment of this disclosure, the address generation apparatus may further perform the steps performed by the first blockchain node in the third aspect and the possible implementations of the third aspect. For concepts of nouns and specific implementation steps in the seventh aspect and some possible implementations of the seventh aspect and beneficial effects brought by each possible implementation, refer to the descriptions in the possible implementations of the third aspect. Details are not described herein again.

According to an eighth aspect, an embodiment of this disclosure provides a blockchain information processing apparatus, which may be used in the blockchain field. The blockchain information processing apparatus is applied to a second blockchain node. The apparatus includes: a generation module, configured to generate a shared key based on a public key of a first blockchain node and a first private key of the second blockchain node; a reading module, configured to read at least one piece of transaction information on a blockchain; and a determining module, configured to: when second transaction information exists in the at least one piece of transaction information, determine that a transaction indicated by the first transaction content is a successful transaction, where the second transaction information includes a public key address of the first blockchain node, a second public key address of the second blockchain node, the first transaction content, and an encrypted fifth private key. The public key address of the first blockchain node belongs to the first blockchain node, the first transaction content is content of a transaction between the first blockchain node and the second blockchain node, the second transaction information written into the blockchain is verified by the second blockchain node based on the second public key address, the encrypted fifth private key can be decrypted by using the shared key, and the second public key address can be generated based on the fifth private key.

In the eighth aspect of the embodiments of this disclosure, the blockchain information processing apparatus may further perform the steps performed by the second blockchain node in the possible implementations of the fourth aspect. For concepts of nouns and specific implementation steps in the eighth aspect of the embodiments of this disclosure and some possible implementations of the eighth aspect and beneficial effects brought by each possible implementation, refer to the descriptions in the possible implementations of the fourth aspect. Details are not described herein again.

According to a ninth aspect, an embodiment of this disclosure provides a computer program. When the computer program is run on a computer, the computer is enabled to perform the address generation method according to the first aspect or the third aspect, or the computer is enabled to perform the blockchain information processing method according to the second aspect or the fourth aspect.

According to a tenth aspect, an embodiment of this disclosure provides a blockchain node, including: a processor, where the processor is coupled to a memory. The memory is configured to store a program. The processor is configured to execute the program in the memory, so that the blockchain node performs the address generation method according to the first aspect or the third aspect, or the blockchain node performs the blockchain information processing method according to the second aspect or the fourth aspect.

According to an eleventh aspect, an embodiment of this disclosure provides a computer-readable storage medium. The computer-readable storage medium stores a computer program, and when the computer program is run on a computer, the computer is enabled to perform the address generation method according to the first aspect or the third aspect, or the computer is enabled to perform the blockchain information processing method according to the second aspect or the fourth aspect.

According to a twelfth aspect, an embodiment of this disclosure provides a circuit system. The circuit system includes a processing circuit. The processing circuit is configured to perform the address generation method according to the first aspect or the third aspect, or the processing circuit is configured to perform the blockchain information processing method according to the second aspect or the fourth aspect.

According to a thirteenth aspect, an embodiment of this disclosure provides a chip system. The chip system includes a processor, configured to support implementation of functions in the foregoing aspects, for example, sending or processing data and/or information in the foregoing method. In a possible design, the chip system further includes a memory. The memory is configured to store program instructions and data that are necessary for a server or a communication device. The chip system may include a chip, or may include a chip and another discrete device

DESCRIPTION OF EMBODIMENTS

Figure 1:
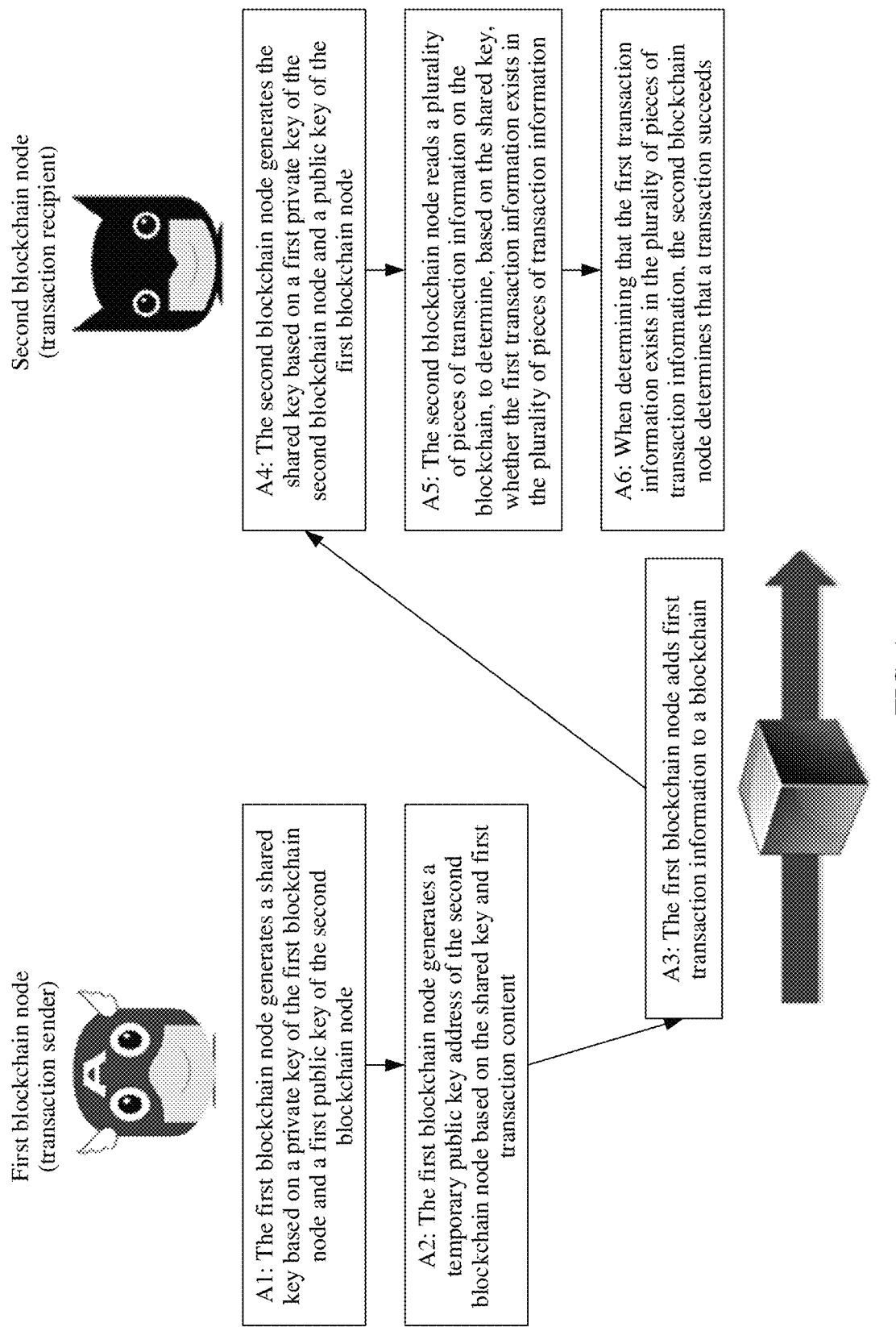
FIG. 1 is a schematic flowchart of a blockchain information processing method according to an embodiment of this disclosure.

Embodiments of this disclosure provide an address generation method, a blockchain information processing method, and a related device. A shared key used for verification may also be generated by using a public key of a first blockchain node and a first private key of a second blockchain node. That is, a recipient may also generate the shared key to verify transaction information. The recipient does not need to store or manage a plurality of public-private key pairs, which simplifies management.

In the specification, claims, and accompanying drawings of this disclosure, the terms "first", "second", and the like are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this disclosure. In addition, the terms "include", "have" and any other variants thereof mean to cover the non-exclusive inclusion, so that a process, method, system, product, or device that includes a series of units is not necessarily limited to those units, but may include other units not expressly listed or inherent to such a process, method, product, or device.

The following describes embodiments of this disclosure with reference to the accompanying drawings. A person of ordinary skill in the art may learn that, with development of technologies and emergence of new scenarios, the technical solutions provided in embodiments of this disclosure are also applicable to similar technical problems.

The embodiments of this disclosure may be applied to a blockchain technology, and in particular, to a scenario in which a transaction sender wants to hide a real identity of a transaction recipient. For example, a manufacturer does not want others to know a retailer of the manufacturer. For another example, a retailer does not want others to know a customer of the retailer. Application scenarios in this embodiment of this disclosure are not exhaustively listed herein. Before the detailed implementation solutions of the blockchain information processing methods provided in the embodiments of this disclosure are described, some basic concepts in the embodiments of this disclosure are first described.

1. Blockchain Technology

The blockchain technology is a technical solution that stores, verifies, transfers, and communicates network data through distributed nodes without relying on a third party. A blockchain can record data in a point-to-point network. Each participant can use a consensus algorithm to view, verify, and reject data on the blockchain. The data that is successfully verified is stored in a ledger as "blocks" and stored on "chains" that are arranged in chronological order and cannot be changed. Blockchains are classified into three types: public blockchains, private blockchains, and consortium blockchains.

A public blockchain is open to all users. The users can access a network and blocks anonymously without registration and authorization, and anyone can join or exit the network and participate in ledger recording and transactions. A public blockchain is a truly decentralized blockchain. The public blockchain uses cryptographic (asymmetric cryptography) algorithms to ensure security and immutability of transactions, and establishes a mutual trust and consensus mechanism in an unfamiliar network environment. In the public blockchain, consensus mechanisms usually include proof of work (POW) and proof of stake (POS). The public blockchain is also known as a permissionless blockchain. That is, users can participate in all network activities without identity authentication. Currently, Bitcoin, Ethercoin, most of copycat coins, and smart contracts are built on public blockchains. The origin of the public blockchains is the Bitcoin blockchain. The public blockchain is applied to scenarios such as digital currency, e-commerce, Internet finance, and intellectual property rights.

Private blockchains are open to individuals or entities and are used only by private organizations (for example, in companies). The read permission, and write permission, and ledger recording permissions on the private blockchains are defined by the private organizations, for example, office approval and financial audit within an enterprise, and budgeting and execution in government industries.

The consortium blockchain is only applicable to consortium members. Because all or some of the functions are available to the consortium members, the read permission, write permission, and ledger recording rules on the consortium blockchain are customized based on the consortium rules. A consensus process on the consortium blockchain is controlled by pre-selected nodes. Generally, the consensus process is applicable to B2B scenarios such as inter-agency transactions, settlement, and clearing. For example, the People's Bank of China develops a settlement and clearing system based on a consortium blockchain, and banks such as Industrial and Commercial Bank of China, China Construction Bank, Bank of China, and Agricultural Bank of China join the system as consortium members and obtain corresponding permissions to perform real-time settlement and clearing with different banks. The consortium blockchain almost does not use the proof-of-work consensus mechanism, but uses the proof-of-stake or practical byzantine fault tolerance (PBTF) consensus algorithm. The consortium blockchain is maintained by participating organizations and provides a complete set of security management functions, such as management, authentication, authorization, monitoring, and audit, for the participating organizations.

2. Smart Contract

A smart contract is a contract that can be self-executed based on a blockchain technology. Once a condition is met, behavior or payment can be automatically triggered. A smart contract is a collection of code and data, and can be deployed on a blockchain. A smart contract is more like a Java program. Code of the Java program is interpreted by a Java virtual machine into bytes for execution, and a smart contract of Ethereum is interpreted by an Ethereum virtual machine (EVM) into bytes for execution. A smart contract has its own account, and can automatically perform some functions driven by a time or an event, for example, transferring information between each other and modifying a blockchain status such as account information.

3. Asymmetric Cryptography

Asymmetric cryptography is a type of cryptographic algorithm in which a pair of keys are needed: a public key and a private key. The foregoing two keys are mathematically related, and information obtained through encryption by using a key of a user can be decrypted only by using a decryption key of the user. Even if the public key is known, the private key cannot be obtained through calculation. The private key is held by the key pair owner and cannot be published. The public key is published by the key pair owner to others. The public key is used to encrypt data. Data encrypted using the public key can be decrypted only by using the private key.

To resolve the foregoing problem, an embodiment of this disclosure provides a blockchain information processing method, so as to generate a temporary public key address for a transaction recipient. When a transaction sender performs different transactions with a same transaction recipient, public key addresses of the transaction recipient are different. Therefore, a real identity of the transaction recipient cannot be indicated by using the public key address of the transaction recipient, so that the real identity of the transaction recipient is hidden. In addition, the transaction recipient does not need to store the temporary public key address for a long time, so as to avoid increasing management difficulty of the transaction recipient.

Figure 2:
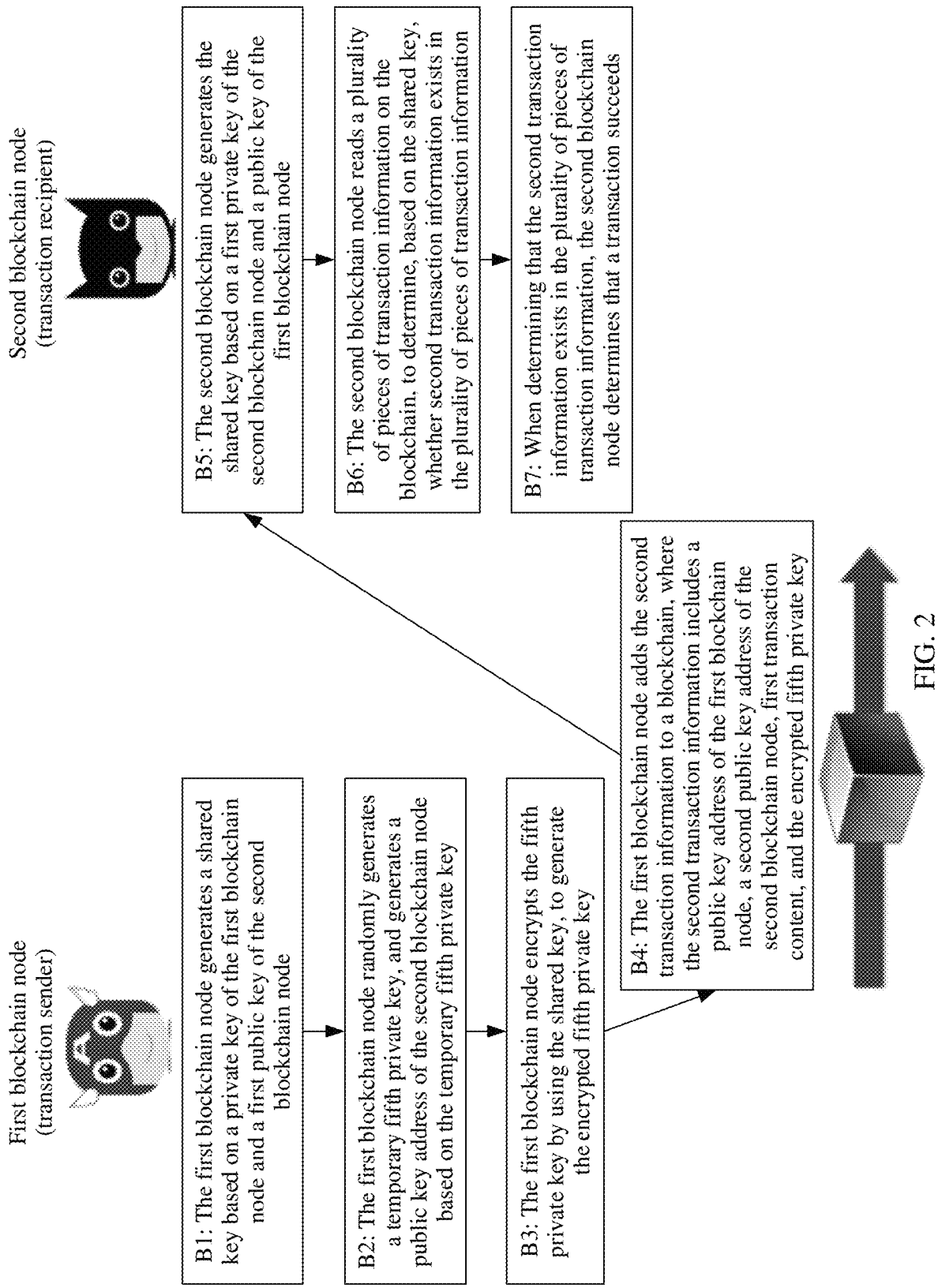
FIG. 2 is another schematic flowchart of a blockchain information processing method according to an embodiment of this disclosure.

In this embodiment of this disclosure, blockchain information processing methods provided in the embodiments of this disclosure are first briefly described with reference to FIG. 1 and FIG. 2. FIG. 1 and FIG. 2 are two schematic flowcharts of blockchain information processing methods according to the embodiments of this disclosure. In FIG. 1 and FIG. 2, that a transaction sender and a transaction recipient have only one set of fixed keys is used as an example. In an implementation, first refer to FIG. 1. In the implementation shown in FIG. 1, a temporary public key address of a second blockchain node is generated by using a shared key. In this embodiment, A1: A first blockchain node (that is, the transaction sender) generates a shared key based on a private key of the first blockchain node and a first public key of a second blockchain node (that is, the transaction recipient). A2: In each transaction, the first blockchain node generates a temporary public key address of the second blockchain node based on the shared key and first transaction content (that is, content of the transaction between the transaction sender and the transaction recipient). A3: The first blockchain node adds first transaction information to a blockchain, where the first transaction information includes a public key address of the first blockchain node, a first public key address, and the first transaction content. A4: The second blockchain node generates the shared key based on a first private key of the second blockchain node and a public key of the first blockchain node. A5: The second blockchain node reads a plurality of pieces of transaction information on the blockchain, to determine, one by one based on the shared key, whether the first transaction information exists in the plurality of pieces of transaction information. The first transaction information includes the public key address of the first blockchain node, the first public key address, and the first transaction content; and the public key address of the first blockchain node belongs to the first blockchain node, the first transaction content is the content of the transaction between the first blockchain node and the second blockchain node, and the first public key address needs to be verified by using the shared key and the first transaction content. A6: When determining that the first transaction information exists in the plurality of pieces of transaction information, the second blockchain node determines that a transaction indicated by the first transaction information succeeds; or when determining that the first transaction information does not exist in the plurality of pieces of transaction information, the second blockchain node determines that a transaction indicated by the first transaction information fails. Because the temporary public key address generated for the second blockchain node in each transaction process is generated based on the first transaction content, and transaction content varies with different transactions, it is ensured that the temporary public key address is one-time and cannot indicate a specific transaction recipient. In addition, the second blockchain can complete verification of the transaction information without storing a redundant temporary public key, a redundant temporary private key, or the like, thereby avoiding increasing management difficulty of the transaction recipient.

In another implementation, refer to FIG. 2. B1: A first blockchain node (that is, the transaction sender) generates a shared key based on a private key of the first blockchain node and a first public key of a second blockchain node (that is, the transaction recipient). B2: In each transaction, the first blockchain node randomly generates a temporary fifth private key, and generates a public key address of the second blockchain node based on the temporary fifth private key. B3: The first blockchain node encrypts the fifth private key by using the shared key, to generate the encrypted fifth private key. B4: The first blockchain node adds the second transaction information to a blockchain, where the second transaction information includes a public key address of the first blockchain node, a second public key address of the second blockchain node, first transaction content, and the encrypted fifth private key. B5: The second blockchain node generates the shared key based on a first private key of the second blockchain node and a public key of the first blockchain node. B6: The second blockchain node reads a plurality of pieces of transaction information on the blockchain, to determine, one by one based on the shared key, whether second transaction information exists in the plurality of pieces of transaction information. The second transaction information includes the public key address of the first blockchain node, the second public key address, the first transaction content, and the encrypted fifth private key. The encrypted fifth private key can be decrypted by using the shared key, and the second public key address can be generated based on the fifth private key. That is, whether the obtained transaction information is the second transaction information can be verified by using the generated shared key. B7: When determining that the second transaction information exists in the plurality of pieces of transaction information, the second blockchain node determines that the transaction indicated by the second transaction information succeeds. Because the temporary public key address generated for the second blockchain node in each transaction process is generated based on the randomly generated fifth private key, it is ensured that the temporary public key address is one-time and cannot indicate a specific transaction recipient. In addition, the second blockchain can complete verification of the transaction information without storing a redundant temporary public key, a redundant temporary private key, or the like, thereby avoiding increasing management difficulty of the transaction recipient.

Because specific procedures of the foregoing two implementations are different, the following separately describes the foregoing two cases in detail.

I. A Shared Key is Used to Generate a First Public Key Address

Figure 3:
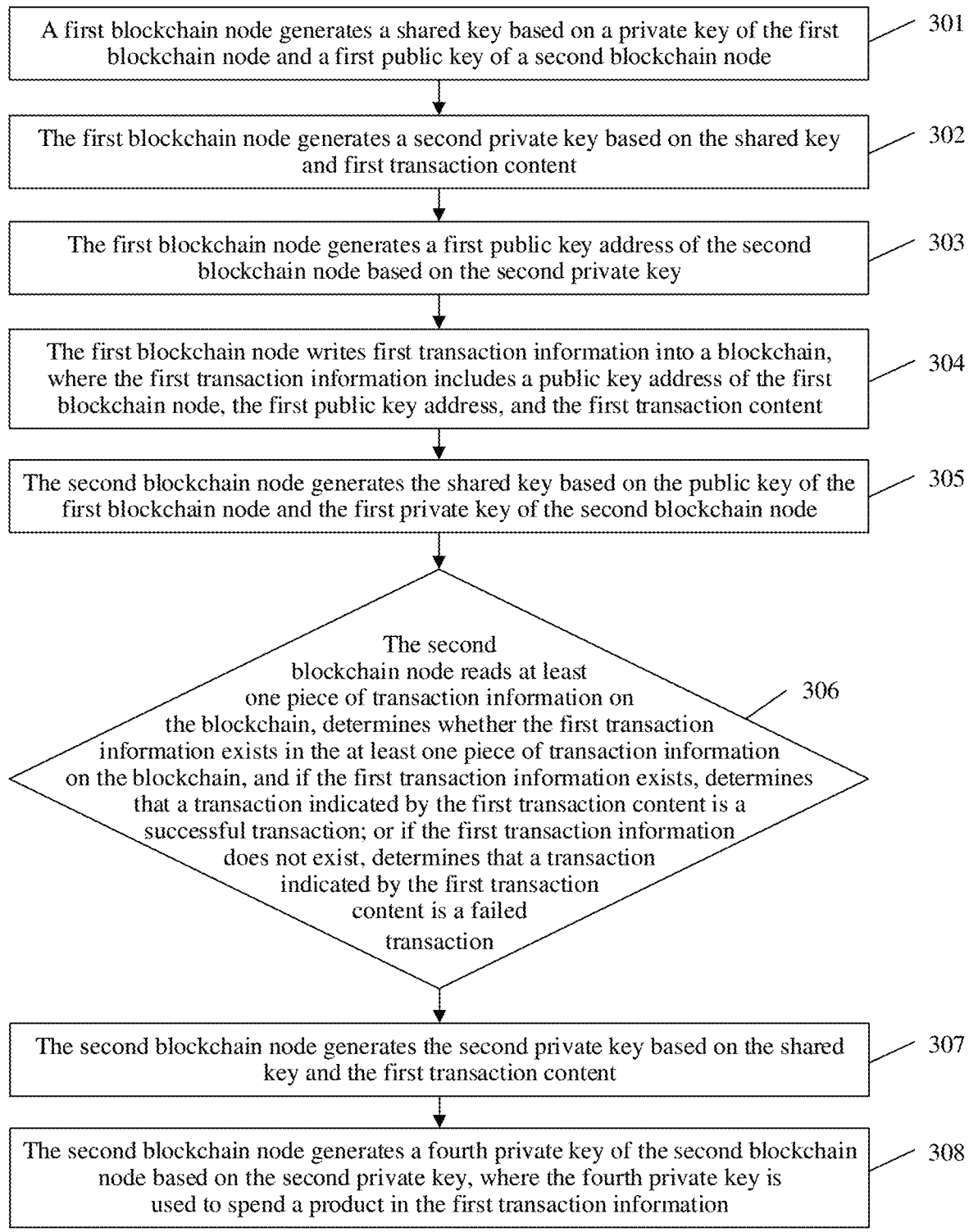
FIG. 3 is still another schematic flowchart of a blockchain information processing method according to an embodiment of this disclosure.

In this embodiment of this disclosure, refer to FIG. 3. FIG. 3 is a schematic flowchart of a blockchain information processing method according to an embodiment of this disclosure. The blockchain information processing method provided in this embodiment of this disclosure may include the following steps.

301. A first blockchain node generates a shared key based on a private key of a first blockchain node and a first public key of a second blockchain node.

In this embodiment of this disclosure, the first blockchain node can obtain the private key of the first blockchain node and the first public key of the second blockchain node, and generate the shared key (derive shared key) based on the private key of the first blockchain node and the first public key of the second blockchain node. The first blockchain node and the second blockchain node are two blockchain nodes on a blockchain, the first blockchain node is a transaction sender, and the second blockchain node is a transaction recipient. The shared key may also be referred to as a symmetric key or a symmetric shared key, and the second blockchain node may also generate the shared key based on a public key of the first blockchain node and a first private key of the second blockchain node.

Further, in a case, both the first blockchain node and the second blockchain node have only one set of fixed keys (single-key scheme), the set of fixed keys includes one long-term private key and one long-term public key, the private key of the first blockchain node is the long-term private key of the first blockchain node, the first public key of the second blockchain node is the long-term public key of the second blockchain node, the public key of the first blockchain node is the long-term public key of the first blockchain node, and the first private key of the second blockchain node is the long-term private key of the second blockchain node.

In another case, both the first blockchain node and the second blockchain node have two sets of fixed keys (Dual-Key scheme). The two sets of fixed keys include a first set of fixed keys and a second set of fixed keys. The first set of fixed key includes one long-term private key and one long-term public key. The second set of fixed keys includes one scanning private key and one scanning public key. In this case, the long-term private key may also be referred to as a spending private key, and the long-term public key may also be referred to as a spending public key. The private key of the first blockchain node is the long-term private key of the first blockchain node, the first public key of the second blockchain node is the scanning public key of the second blockchain node, the public key of the first blockchain node is the long-term public key of the first blockchain node, and the first private key of the second blockchain node is the scanning private key of the second blockchain node. In this embodiment of this disclosure, the blockchain information processing method provided may be applied not only to a case in which a blockchain node has only one set of fixed keys, but also to a case in which a blockchain node has two sets of fixed keys, thereby extending an application scenario of this solution.

In this embodiment, in an implementation, the first blockchain node performs dot product multiplication on the private key of the first blockchain node and the first public key of the second blockchain node based on a static Diffie-Hellman algorithm in an elliptic curve public key cryptosystem, to obtain the shared key. For a more intuitive understanding of this solution, the following uses an example in which the second blockchain node has two sets of fixed keys to disclose an example of a formula used by the first blockchain node to generate the shared key in the elliptic curve public key cryptosystem:

$$S = a \cdot D = ad \cdot G \tag{1}$$

S represents the shared key; a represents the private key of the first blockchain node; D represents the first public key of the second blockchain node (that is, the scanning public key of the second blockchain node); D is obtained by performing dot product multiplication on the first private key d of the second blockchain node (that is, the scanning private key of the second blockchain node) and a generator (G); and G represents a generator of an elliptic curve group, and may also be referred to as a base point on an elliptic curve. It should be noted that, although the user considers that both the private key of the first blockchain node and the first public key of the second blockchain node are represented as keys including letters and digits, for a computer, both may be represented in a binary coding manner.

In another implementation, the first blockchain node performs an exponential operation based on the private key of the first blockchain node and the first public key of the second blockchain node in a discrete logarithm public key cryptosystem, to obtain the shared key, where the first public key of the second blockchain node is a base in the exponential operation, and the private key of the first blockchain node is an exponent in the exponential operation.

Further, in the discrete logarithm public key cryptosystem, the first public key of the second blockchain node is obtained by performing an exponential operation on the first private key of the second blockchain node and the generator G, where the generator G is a base in the exponential operation, and the first private key of the second blockchain node is an exponent in the exponential operation. In the discrete logarithm public key cryptosystem, the generator G represents a generator of an integer group or a generator of a prime number group.

In the embodiments of this disclosure, the manners of generating the shared key in the elliptic curve public key cryptosystem and the discrete logarithm public key cryptosystem are separately disclosed, thereby extending an application scenario of this solution.

302. The first blockchain node generates a second private key based on the shared key and first transaction content.

In some embodiments of this disclosure, after generating the shared key, the first blockchain node may generate a temporary second private key (generate temporary private key) based on the shared key and the first transaction content. Because transaction content corresponding to different transactions is different, private keys generated based on different transaction content are different. Therefore, the second private key is one-time, that is, the second private key is temporary rather than fixed. It should be noted that the second private key is a key generated in a process of generating the one-time public key address of the second blockchain node, does not belong to the first blockchain node or the second blockchain node, and does not need to be used to decrypt any transaction information.

In this embodiment, the first blockchain node combines the shared key and the first transaction content (Txcontents), to obtain a first combination result; and performs a hash operation on the first combination result, to generate the second private key. The first transaction content is transaction content of a current transaction between the first blockchain node and the second blockchain node. The first transaction content includes a timestamp, which is used to indicate a time of the transaction indicated by the first transaction content. For example, the first transaction content may be "transfer three Bitcoins", "sell two boxes of kiwifruits", "sell a car", and the like. The first transaction content is not exhaustively listed herein. A combination manner includes but is not limited to concatenation, exclusive OR operation, addition, or the like; and a used hash function includes but is not limited to SHA256, SHA512, or another hash function. The combination manners and the used hash functions are not exhaustively listed herein. In this embodiment of this disclosure, a specific implementation of generating the second private key is provided, which is simple in operation and easy to implement.

For a more intuitive understanding of this solution, the following provides an example of a formula for generating the second private key:

$$r = \text{Hash}(Txcontents, S) \quad (2)$$

r represents the second private key; Txcontents represents the first transaction content; S represents the shared key; and "Txcontents, S" represents concatenation of the first transaction content and the shared key. It should be noted that formula (2) is merely an example, and is not intended to limit this solution.

303. The first blockchain node generates a first public key address of the second blockchain node based on the second private key.

In this embodiment of this disclosure, after generating the second private key, the first blockchain node may generate a temporary third public key (generate temporary public key) based on the temporary second private key, and then generate a temporary first public key address of the second blockchain node based on the temporary third public key. It should be noted that the third public key and the second private key have similar functions, and both are keys generated in the process of generating the one-time public key address of the second blockchain node; and neither of the keys belongs to the first blockchain node or the second blockchain node, and neither of the keys needs to be used to decrypt any transaction information. Because the first public key address is used only when the first blockchain node sends first transaction information to the second blockchain node, the first public key address is referred to as a temporary public key address, or may be referred to as a one-time public key address.

In some embodiments, the first blockchain node generates the first public key address of the second blockchain node based on the second private key and the second public key of the second blockchain node. Regardless of whether the second blockchain node has only one set of fixed keys or the second blockchain node has two sets of fixed keys, the second public key of the second blockchain node is the long-term public key of the second blockchain node. Further, if the second blockchain node has only one set of fixed keys, the first public key of the second blockchain node and the second public key of the second blockchain node may be a same key. If the second blockchain node has two sets of fixed keys, the first public key of the second blockchain node and the second public key of the second blockchain node may be different keys, the first public key of the second blockchain node is the scanning public key of the second blockchain node, and the second public key of the second blockchain node is the long-term public key of the second blockchain node.

In this embodiment of this disclosure, if the first public key address is generated based on the second private key and the second public key of the second blockchain node, the third private key of the second blockchain node needs to be used to generate a private key used to spend a product in the first transaction information. Therefore, after transferring the product in the first transaction information to the second blockchain node, the first blockchain node can still spend the product in the first transaction information, thereby ensuring security of the property of the second blockchain node and stability of transactions on the blockchain.

In this embodiment, in a case, step 303 may include: the first blockchain node generates the temporary third public key based on the temporary second private key and the second public key of the second blockchain node in the elliptic curve public key cryptosystem, and generate the temporary first public key address based on the temporary third public key.

Further, in an implementation, the first blockchain node performs dot product multiplication on the temporary second private key r and the generator G (that is, a generator of an elliptic curve group) based on the temporary second private key r in the elliptic curve public key cryptosystem, to generate the temporary public key R, and then adds the temporary public key R to the second public key B of the second blockchain node, to generate the temporary third public key T, that is, the temporary third public key T=R+B, and then generates the first public key address based on the temporary third public key T under the constraint of the elliptic curve public key cryptosystem.

In another implementation, the first blockchain node performs dot product multiplication on the temporary second private key r and a generator G (that is, a generator of an elliptic curve group) based on the temporary second private key r in the elliptic curve public key cryptosystem, to generate the temporary public key R, and subtracts the second public key B of the second blockchain node from the temporary public key R, to generate the temporary third public key T, that is, the temporary third public key T=R−B, and then generates the first public key address based on the temporary third public key T under the constraint of the elliptic curve public key cryptosystem.

In another implementation, the first blockchain node multiplies the temporary second private key r by the second public key B of the second blockchain node based on the temporary second private key r in the elliptic curve public key cryptosystem, to generate the temporary third public key T, that is, the temporary third public key T=r·B, and then generates the first public key address based on the temporary third public key T under the constraint of the elliptic curve public key cryptosystem.

In another implementation, the first blockchain node multiplies a reciprocal of the temporary second private key r by a second public key B of the second blockchain node based on the temporary second private key r, to generate the temporary third public key T in the elliptic curve public key cryptosystem, and then generates the first public key address and the like based on the temporary third public key T under the constraint of the elliptic curve public key cryptosystem. The manners of generating the first public key address in the elliptic curve public key cryptosystem are exhaustively listed herein. It should be understood that the examples herein are merely intended to facilitate understanding of this solution, and are not intended to limit this solution.

In another case, step 303 may include: the first blockchain node generates a temporary third public key based on a temporary second private key and the second public key of the second blockchain node in the discrete logarithm public key cryptosystem, and generates the temporary first public key address based on the temporary third public key.

Further, in an implementation, the first blockchain node performs an exponential operation on the temporary second private key r and the second public key B of the second blockchain node based on the temporary second private key r, to generate the temporary third public key T, where the second public key B of the second blockchain node is a base in the exponential operation, and the temporary second private key r is an exponent in the exponential operation, and then generates the first public key address and the like based on the temporary third public key T under the constraint of the discrete logarithm public key cryptosystem. The manners of generating the first public key address in the discrete logarithm public key cryptosystem are not exhaustively listed herein. It should be understood that the examples herein are merely intended to facilitate understanding of this solution, and are not intended to limit this solution.

In this embodiment of this disclosure, in both the elliptic curve public key cryptosystem and the discrete logarithm public key cryptosystem, the temporary third public key can be generated based on the temporary second private key and the second public key of the second blockchain node, and the temporary first public key address can be generated based on the temporary third public key, thereby extending an application scenario of this solution.

304: The first blockchain node writes first transaction information into a blockchain, where the first transaction information includes a public key address of the first blockchain node, a first public key address, and the first transaction content.

In this embodiment of this disclosure, after generating the one-time first public key address for the second blockchain node, the first blockchain node writes the first transaction information into the blockchain, that is, adds the first transaction information to the blockchain. The first transaction information includes the public key address of the first blockchain node (that is, content of the Input field is a public key address of the transaction sender), the first public key address (that is, content of the Output field is a public key address of the transaction recipient), and the first transaction content.

Further, the public key address of the first blockchain node belongs to the first blockchain node. If the transaction indicated by the first transaction content is initiated by the first blockchain node, regardless of whether the first blockchain node has one set of fixed keys or two sets of fixed keys, the public key address of the first blockchain node is generated based on a long-term public key of the first blockchain node. If the transaction indicated the first transaction content is transferred by the third blockchain node to the first blockchain node, the public key address of the first blockchain node is a temporary public key address generated by the third blockchain node for the first blockchain node. For a specific manner of generating the temporary public key address, refer to the descriptions in steps 301 to 303. Details are not described herein again. For a meaning of the first transaction content, refer to the description in step 302. Details are not described herein again.

The first transaction information written into the blockchain is verified by the second blockchain node based on the first public key address. The first public key address needs to be verified by using a shared key, and the shared key can be generated by using the public key of the first blockchain node and the third private key of the second blockchain node. That is, the second blockchain node can independently generate the foregoing shared key.

305. The second blockchain node generates the shared key based on the public key of the first blockchain node and the first private key of the second blockchain node.

In this embodiment of this disclosure, the second blockchain node can obtain the public key of the first blockchain node and the first private key of the second blockchain node, and the second blockchain node generates the shared key based on the public key of the first blockchain node and the first private key of the second blockchain node. In a case, both the first blockchain node and the second blockchain node have only one set of fixed keys, the set of fixed keys includes one long-term private key and one long-term public key, the public key of the first blockchain node is the long-term public key of the first blockchain node, and the first private key of the second blockchain node is the long-term private key of the second blockchain node.

In another case, both the first blockchain node and the second blockchain node have two sets of fixed keys, the two sets of fixed keys include a first set of fixed keys and a second set of fixed keys, the first set of fixed keys includes one long-term private key and one long-term public key, and the second set of fixed keys includes one scanning private key and one scanning public key. Corresponding to step 301, the public key of the first blockchain node is the long-term public key of the first blockchain node, and the first private key of the second blockchain node is the scanning private key of the second blockchain node.

In this embodiment, corresponding to step 301, in an implementation, the second blockchain node performs dot product multiplication on the public key of the first blockchain node and the first private key of the second blockchain node based on the static Diffie-Hellman algorithm in the elliptic curve public key cryptosystem, to obtain the shared key. For a more intuitive understanding of this solution, the following uses an example in which the second blockchain node has two sets of private keys to disclose an example of a formula used by the second blockchain node to generate the shared key in the elliptic curve public key cryptosystem:

$$S = d \cdot A = da \cdot G \quad (3)$$

S represents the shared key; d represents the first private key of the second blockchain node (that is, the scanning private key of the second blockchain node); A represents the public key of the first blockchain node; A is obtained by performing dot product multiplication on the private key a of the first blockchain node on a generator (generator, G); and G represents a generator of an elliptic curve group, and may also be referred to as a base point on an elliptic curve. In this case, the second blockchain node may also generate the shared key. It should be noted that, although the user considers that both the first private key of the second blockchain node and the public key of the first blockchain node are represented as keys including letters and digits, for a computer, both may be represented in a binary coding manner.

In another implementation, in the discrete logarithm public key cryptosystem, an exponential operation is performed based on the public key of the first blockchain node and the first private key of the second blockchain node, where the public key of the first blockchain node is a base in the exponential operation, and the first private key of the second blockchain node is an exponent in the exponential operation.

Further, in the discrete logarithm public key cryptosystem, the public key of the first blockchain node is obtained by performing an exponential operation on the private key of the first blockchain node and the generator G, where the generator G is a base in the exponential operation, and the private key of the first blockchain node is an exponent in the exponential operation. In the discrete logarithm public key cryptosystem, the generator G represents a generator of an integer group or a generator of a prime number group.

306. The second blockchain node reads at least one piece of transaction information on the blockchain, determines whether the first transaction information exists in the at least one piece of transaction information on the blockchain, and if the first transaction information exists, determines that the transaction indicated by the first transaction content is a successful transaction; or if the first transaction information does not exist, determines that the transaction indicated by the first transaction content is a failed transaction.

In this embodiment of this disclosure, the second blockchain node needs to traverse all transaction information on each blockchain node, that is, needs to read each piece of transaction information on the blockchain, to determine one by one whether each piece of transaction information on the blockchain is the first transaction information, that is, determine whether the first transaction information exists in the at least one piece of transaction information on the blockchain. When the first transaction information exists in the at least one piece of transaction information on the blockchain, it is determined that the transaction indicated by the first transaction content is a successful transaction; or when the first transaction information does not exist in the at least one piece of transaction information on the blockchain, it is determined that the transaction indicated by the first transaction content is a failed transaction.

Each piece of transaction information on the blockchain node includes the public key address of the transaction sender (that is, content of the Input field), the transaction content, and the public key address of the transaction recipient (that is, content of the Output field). The first transaction information includes a public key address of the first blockchain node, first transaction content, and a first public key address of the second blockchain node; and the public key address of the first blockchain node belongs to the first blockchain node, the first transaction content is content of a transaction between the first blockchain node and the second blockchain node, and the first public key address can be generated based on the shared key and the first transaction content. That is, a feature of the first transaction information is that the second blockchain node can generate the public key address of the transaction recipient based on the generated shared key and the transaction content in the transaction information.

In this embodiment, in a process of determining whether any one of the at least one piece of transaction information on the blockchain is the first transaction information, after reading one piece of transaction information, the second blockchain node obtains the transaction content in the transaction information, and generates the temporary public key address based on the shared key generated in step 305 and the obtained transaction content. A specific generation manner is the same as a manner of generating the first public key address in step 302 and step 303. Details are not described herein again. Then, it is determined whether the temporary public key address is the same as a public key address of a recipient that is carried in the transaction information. If the first public key address is the same as the public key address of the recipient that is carried in the transaction information, it is considered that the transaction information is the first transaction information; or if the first public key address is different from the public key address of the recipient that is carried in the transaction information, it is considered that the transaction information is not the first transaction information.

The second blockchain node performs the foregoing operation on each piece of transaction information on the blockchain, to determine whether each piece of transaction information on the blockchain is the first transaction information.

307. The second blockchain node generates the second private key based on the shared key and the first transaction content.

In this embodiment of this disclosure, when the second blockchain node determines that the transaction indicated by the first transaction information is a successful transaction, if the second blockchain node needs to spend the product in the first transaction information, the second blockchain node further needs to generate a temporary fourth private key used to spend the product in the first transaction information. The temporary fourth private key is corresponding to the temporary first public key address. That is, the fourth private key needs to be used to directly generate the temporary first public key address under the constraint of the elliptic curve public key cryptosystem or under the constraint of the discrete logarithm public key cryptosystem.

In this embodiment, a manner in which the second blockchain node generates the temporary fourth private key is corresponding to a manner in which the first blockchain node generates the temporary first public key address. The second blockchain node first needs to generate the second private key based on the shared key and the first transaction content. A specific implementation is the same as the step in which the first blockchain node generates the second private key in step 302, and a meaning of the second private key is the same as the meaning of the second private key in step 302. For details, refer to the description in step 302. Details are not described herein again.

308. The second blockchain node generates the fourth private key of the second blockchain node based on the second private key, where the fourth private key is used to spend the product in the first transaction information.

In this embodiment of this disclosure, the second blockchain node generates the temporary fourth private key of the second blockchain node based on the second private key. Because the temporary fourth private key needs to be corresponding to the temporary first public key address, a manner in which the second blockchain node generates the fourth private key needs to be corresponding to the manner in which the first blockchain node generates the first public key address in step 303.

In this embodiment, in an implementation, the second blockchain node generates the temporary fourth private key of the second blockchain node based on the second private key and the third private key of the second blockchain node.

In this embodiment, in a case, step 308 may include: the second blockchain node generates the temporary fourth private key of the second blockchain node based on the temporary second private key and the third private key of the second blockchain node (that is, the long-term private key of the second blockchain node) in the elliptic curve public key cryptosystem. Regardless of whether the second blockchain node includes one set of fixed keys or two sets of fixed keys, the third private key of the second blockchain node is the long-term private key of the second blockchain node.

Further, corresponding to step 303, in an implementation, the second blockchain node adds, based on the temporary second private key r and in the elliptic curve public key cryptosystem, the second private key r and the third private key b of the second blockchain node, to obtain a first addition result, and performs a modulo operation on the first addition result and q, to obtain the temporary fourth private key of the second blockchain node. The modulo operation may also be referred to as a mod operation. In an elliptic curve public key cryptosystem, q represents the order of the generator. That is, the temporary fourth private key t=(r+b) mod q.

In another implementation, the second blockchain node subtracts, based on the temporary second private key r and in the elliptic curve public key cryptosystem, the third private key b of the second blockchain node from the second private key r, to obtain a first subtraction result, and performs a modulo operation on the first subtraction result and q, to obtain the temporary fourth private key of the second blockchain node, that is, the temporary fourth private key t=(r−b) mod q.

In another implementation, the second blockchain node multiplies, based on the temporary second private key r and in the elliptic curve public key cryptosystem, the second private key r by the third private key b of the second blockchain node, and performs a modulo operation on the multiplication result and q, to obtain the temporary fourth private key of the second blockchain node, that is, the temporary fourth private key t=(rb) mod q.

In another implementation, the second blockchain node multiplies, based on the temporary second private key r and in the elliptic curve public key cryptosystem, a reciprocal of the second private key r by the third private key b of the second blockchain node, and performs a modulo operation on a multiplication result and q, to obtain the temporary fourth private key of the second blockchain node, and the like.

The foregoing example implementations are merely intended to facilitate understanding of this solution, but are not intended to limit this solution. It should be noted that in the foregoing implementations, in the elliptic curve public key cryptosystem, after dot product multiplication is performed on the generated temporary fourth private key t and the generator G, a dot product multiplication result needs to be equal to the temporary third public key T generated in step 303.

In another case, step 308 may include: the second blockchain node generates the temporary fourth private key of the second blockchain node based on the temporary second private key and the third private key of the second blockchain node (that is, the long-term private key of the second blockchain node) in the discrete logarithm public key cryptosystem. Regardless of whether the second blockchain node includes one set of fixed keys or two sets of fixed keys, the third private key of the second blockchain node is the long-term private key of the second blockchain node.

Further, corresponding to step 303, in an implementation, the second blockchain node performs an exponential operation on the temporary second private key r and the third private key b of the second blockchain node in the discrete logarithm public key cryptosystem, to obtain a first operation result, where the third private key b is a base in the exponential operation, and the second private key r is an exponent in the exponential operation. The second blockchain node performs a modulo operation on the first operation result and q, to obtain the temporary fourth private key of the second blockchain node. In the discrete logarithm public key cryptosystem, q represents the order of the generator.

The foregoing example implementations are merely intended to facilitate understanding of this solution, but are not intended to limit this solution. It should be noted that in the foregoing implementations, in the discrete logarithm public key cryptosystem, after exponential operation is performed on the generated temporary fourth private key t and the generator G, a result of the exponential operation needs to be equal to the temporary third public key T generated in step 303.

In this embodiment of this disclosure, a specific manner of generating the private key of the product in the first transaction information when the second blockchain node needs to spend the product in the first transaction information is provided, thereby extending an application scenario of this solution, and improving integrity of this solution.

Figure 4:
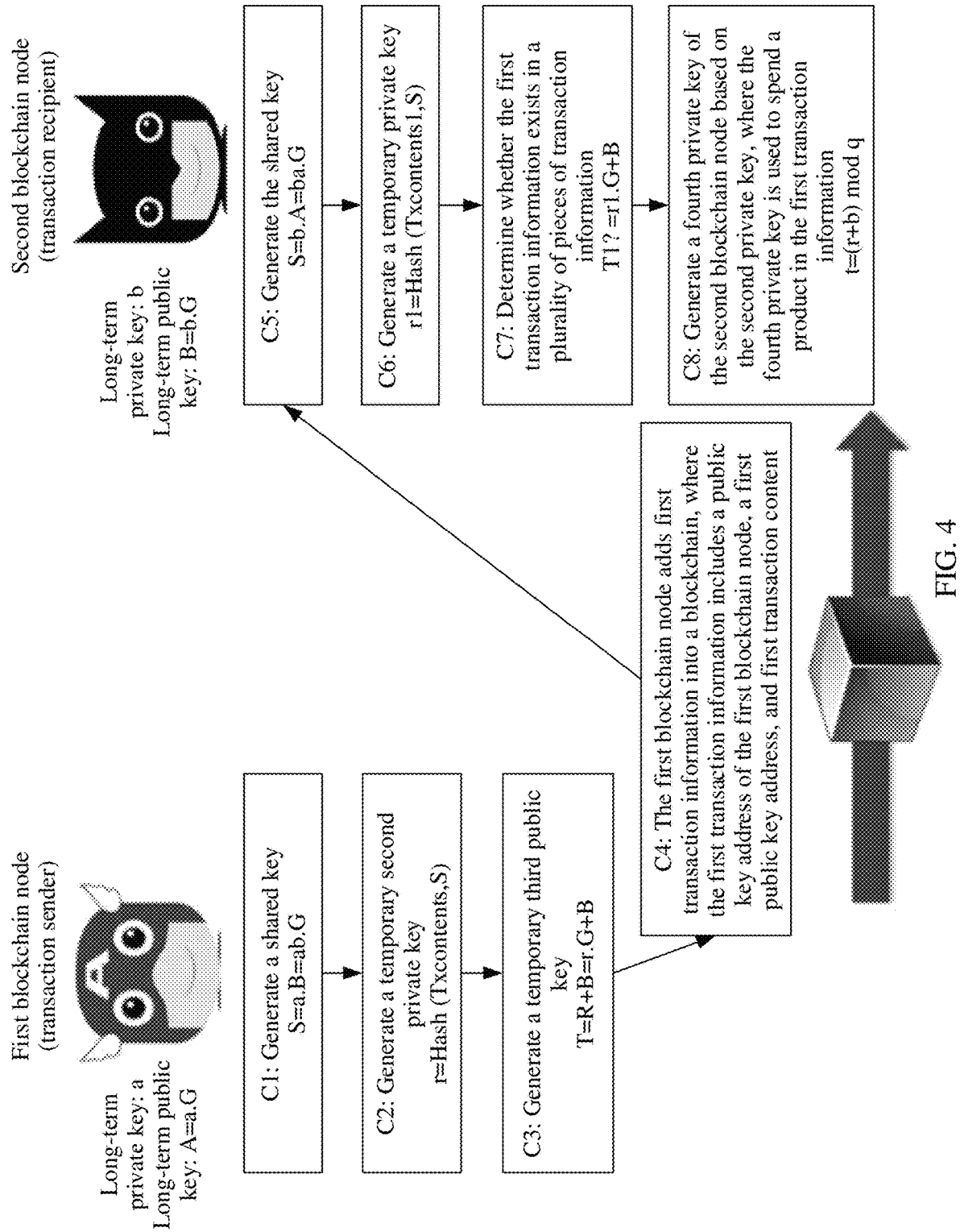
FIG. 4 is still another schematic flowchart of a blockchain information processing method according to an embodiment of this disclosure.
Figure 5:
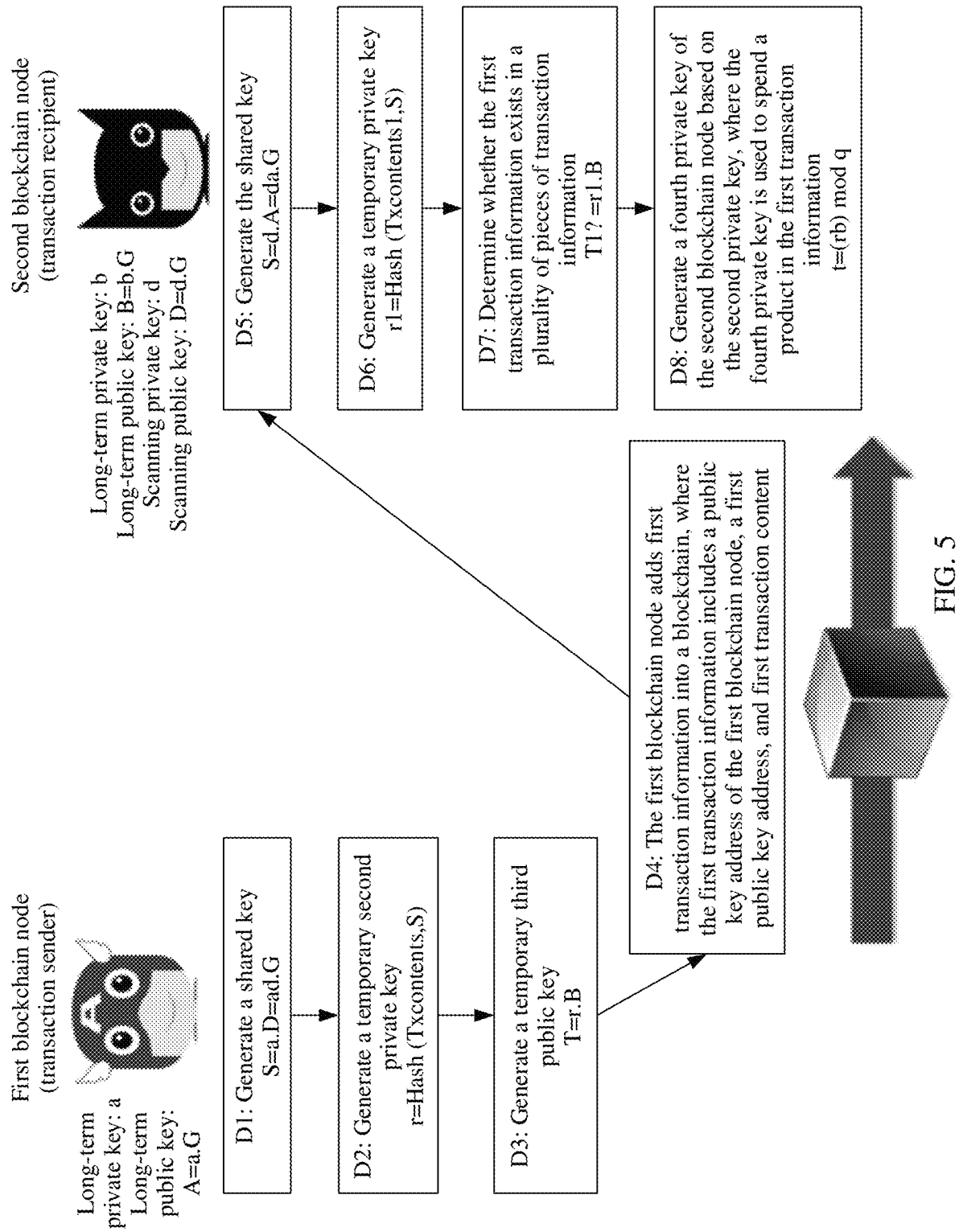
FIG. 5 is still another schematic flowchart of a blockchain information processing method according to an embodiment of this disclosure.

For a more intuitive understanding of this solution, refer to FIG. 4 and FIG. 5. FIG. 4 and FIG. 5 are two schematic flowcharts of the blockchain information processing methods according to the embodiments of this disclosure. In both FIG. 4 and FIG. 5, the elliptic curve public key cryptosystem is used as an example. A difference between FIG. 4 and FIG. 5 lies in that in FIG. 4, both the first blockchain node and the second blockchain node have only one set of fixed keys, while in FIG. 5, both the first blockchain node and the second blockchain node have two sets of fixed keys. First, refer to FIG. 4. A long-term private key a and a long-term public key A are configured in the first blockchain node, and a long-term private key b and a long-term public key B are configured in the second blockchain node. C1: The first blockchain node generates a shared key S by performing dot product multiplication on a and B. C2: The first blockchain node concatenates first transaction content and S, and performs a hash operation on a concatenation result, to generate a temporary second private key r. C3: The first blockchain node performs dot product multiplication on r and G, and adds a dot product multiplication result to B, to generate a temporary third public key T, that is, T=r·G+B=R+B. The temporary third public key T is used to generate a temporary first public key address of the second blockchain node. C4: The first blockchain node adds first transaction information to a blockchain, where the first transaction information includes a public key address of the first blockchain node (that is, a public key address of a transaction sender), the temporary first public key address of the second blockchain node (that is, a public key address of a transaction recipient), and the first transaction content. C5: The second blockchain node generates the shared key S by performing dot product multiplication on b and A. C6: After reading one piece of transaction information on the blockchain, the second blockchain node concatenates the read transaction content (Tx-contents1) and S, and performs a hash operation on a concatenation result, to generate a temporary private key r1. It should be noted that, if the currently read transaction information is the first transaction information, Txcontents1 is the same as Txcontents, and r1 is the same as r; or if the currently read transaction information is not the first transaction information, Txcontents1 is different from Txcontents, and r1 is different from r. C7: The second blockchain node performs dot product multiplication on r1 and G, adds a dot product multiplication result to B to obtain an addition result, compares the addition result obtained through calculation with the public key address of the transaction recipient that is carried in the read transaction information, to determine whether the addition result obtained through calculation is the same as the read public key address of the transaction recipient. If the addition result obtained through calculation is the same as the read public key address of the transaction recipient, it indicates that the read transaction information is the first transaction information, that is, it indicates that a transaction indicated by the first transaction information succeeds; or if none of the transaction information on the blockchain is the first transaction information, it indicates that a transaction performed by using the first transaction information fails. C8: When the transaction indicated by the first transaction information succeeds, if the second blockchain node needs to spend a product in the first transaction information, the second blockchain node further generates a fourth private key of the second blockchain node based on the second private key, where the fourth private key is used to spend the product in the first transaction information, and after dot product multiplication is performed on t and G, a dot product multiplication result needs to be equal to T, that is, t=(r+b) mod q.

Refer to FIG. 5. A long-term private key a and a long-term public key A are configured for the first blockchain node, and a long-term private key b, a long-term public key B, a scanning private key d, and a scanning public key D are configured for the second blockchain node. D1: The first blockchain node generates a shared key S by performing dot product multiplication on a and D. D2: The first blockchain node concatenates first transaction content and S, and performs a hash operation on a concatenation result, to generate a temporary second private key r. D3: The first blockchain node performs dot product multiplication on r and B, to generate a temporary third public key T, where the temporary third public key T is used to generate a temporary first public key address of the second blockchain node. D4: The first blockchain node adds first transaction information to a blockchain, where the first transaction information includes a public key address of the first blockchain node (that is, a public key address of a transaction sender), the temporary first public key address of the second blockchain node (that is, a public key address of a transaction recipient), and the first transaction content. D5: The second blockchain node generates the shared key S by performing dot product multiplication on d and A. D6: After reading one piece of transaction information on the blockchain, the second blockchain node concatenates the read transaction content (Tx-contents1) and S, and performs a hash operation on a concatenation result, to generate a temporary private key r1. D7: The second blockchain node performs dot product multiplication on r1 and B, and determines whether a dot product multiplication result obtained through calculation is the same as the read public key address of the transaction recipient. If the dot product multiplication result obtained through calculation is the same as the read public key address of the transaction recipient, it indicates that the read transaction information is the first transaction information, that is, it indicates that a transaction indicated by the first transaction information succeeds; or if none of transaction information on the blockchain is the first transaction information, it indicates that a transaction performed by using the first transaction information fails. D8: When the transaction indicated by the first transaction information succeeds, if the second blockchain node needs to spend a product in the first transaction information, the second blockchain node further generates a fourth private key of the second blockchain node based on the second private key, where the fourth private key is used to spend the product in the first transaction information, and after dot product multiplication is performed on t and G, a dot product multiplication result needs to be equal to T, that is, t=(rb) mod q. It should be noted that the examples in FIG. 4 and FIG. 5 are merely intended to facilitate understanding of this solution, and are not intended to limit this solution.

In this embodiment of this disclosure, because the public key address of the first transaction information is generated based on the shared key and the first transaction content, and transaction content varies with different transactions, the public key address of each piece of transaction information on the blockchain is one-time, privacy of a recipient can be well protected. In addition, the shared key may alternatively be generated by using the public key of the first blockchain node and the first private key of the second blockchain node. That is, the recipient may generate the shared key, and generate the public key address of the first transaction information based on the shared key and the first transaction content, to verify the transaction information. The recipient does not need to store or manage a plurality of public-private key pairs, thereby simplifying management. In addition, a format of the transaction information written into the blockchain does not need to be changed, thereby simplifying technical update in this solution.

II. A Shared Key is Used to Encrypt a Fifth Private Key

Figure 6:
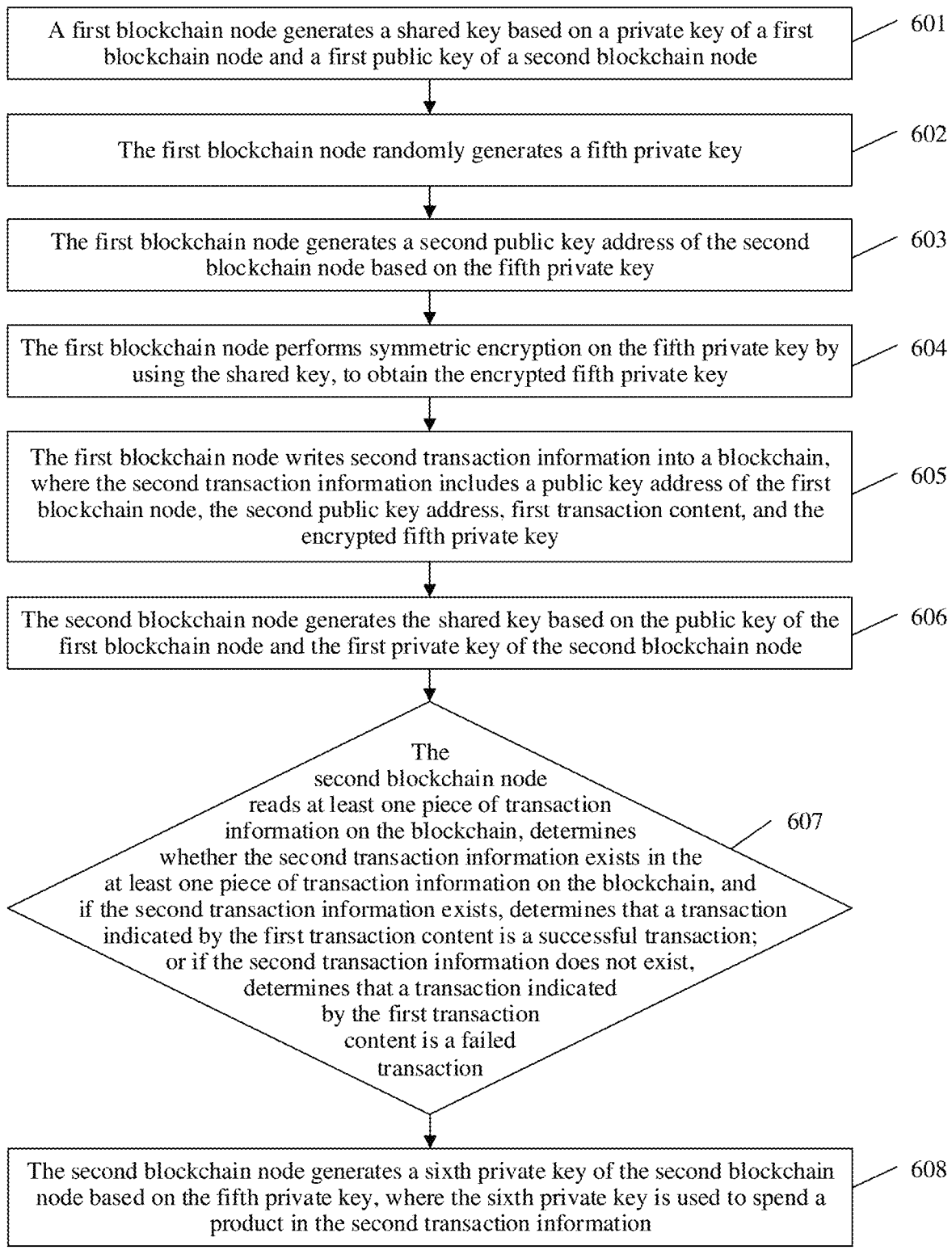
FIG. 6 is still another schematic flowchart of a blockchain information processing method according to an embodiment of this disclosure.

In this embodiment of this disclosure, refer to FIG. 6. FIG. 6 is a schematic flowchart of a blockchain information processing method according to an embodiment of this disclosure. The blockchain information processing method provided in this embodiment of this disclosure may include the following steps.

601. A first blockchain node generates a shared key based on a private key of a first blockchain node and a first public key of a second blockchain node.

In this embodiment of this disclosure, a specific implementation of performing step 601 by the first blockchain node is similar to the specific implementation of step 301 in the embodiment corresponding to FIG. 3. For details, refer to the description in FIG. 3. Details are not described herein again.

602. The first blockchain node randomly generates a fifth private key.

In some embodiments of this disclosure, the first blockchain node randomly generates the fifth private key. The fifth private key is also a temporary one-time private key, and a function of the fifth private key is similar to the function of the second private key in the embodiment corresponding to FIG. 3. The fifth private key is a private key generated in a process of generating the one-time public key address of the second blockchain node, does not belong to the first blockchain node or the second blockchain node, and does not need to be used to decrypt any transaction information.

It should be noted that an execution sequence of step 601 and step 602 is not limited in this embodiment of this disclosure. Step 601 may be performed before step 602, or step 602 may be performed before step 601, or step 601 and step 602 may be simultaneously performed.

603. The first blockchain node generates a second public key address of the second blockchain node based on the fifth private key.

In this embodiment of this disclosure, after randomly generating the fifth private key, the first blockchain node generates a temporary fourth public key based on the fifth private key, and then generates a temporary second public key address of the second blockchain node based on the temporary fourth public key. A meaning of the temporary fourth public key is similar to the meaning of the temporary third public key in the embodiment corresponding to FIG. 3, and a function of the temporary fourth public key is the same as the function of the temporary third public key in the embodiment corresponding to FIG. 3. The temporary fourth public key is a key generated in a process of generating the second public key address of the second blockchain node, does not belong to the first blockchain node or the second blockchain node, and does not need to be used to decrypt any transaction information.

In this embodiment, the first blockchain node generates the temporary fourth public key based on the fifth private key and the second public key of the second blockchain node, and then generates the temporary second public key address of the second blockchain node based on the temporary fourth public key.

For both a concept of the second public key address of the second blockchain node and a concept of the second public key of the second blockchain node, refer to the descriptions in the embodiments corresponding to FIG. 3. A specific implementation of performing step 603 by the first blockchain node is similar to the specific implementation of step 303 in the embodiment corresponding to FIG. 3, and a difference lies only in that the second private key in step 303 in the embodiment corresponding to FIG. 3 is replaced with the fifth private key in step 603. For a specific implementation and beneficial effects, refer to the description in FIG. 3. Details are not described herein again.

604. The first blockchain node performs symmetric encryption on the fifth private key by using the shared key, to obtain the encrypted fifth private key.

In some embodiments of this disclosure, the first blockchain node performs symmetric encryption on the fifth private key by using the shared key generated in step 601, to obtain the encrypted fifth private key. The encrypted fifth private key may be represented as En(h, S), where h represents the randomly generated fifth private key, S represents the shared key, and En(h, S) represents that symmetric encryption is performed on h by using the shared key. A symmetric encryption algorithm refers to an encryption algorithm that uses a same key for encryption and decryption. The symmetric encryption algorithm includes but is not limited to Data Encryption Standard (DES), Triple Data Encryption Standard (3DES), Advanced Encryption Standard (AES), or another symmetric encryption algorithm. Not all the symmetric encryption algorithms are listed herein. A specific symmetric encryption algorithm to be used may be flexibly selected according to an actual situation, and is not limited herein.

It should be noted that an execution sequence of step 603 and step 604 is not limited in this embodiment of this disclosure. Step 603 may be performed before step 604, or step 604 may be performed before step 603, or step 603 and step 604 may be simultaneously performed.

605. The first blockchain node writes second transaction information into the blockchain, where the second transaction information includes a public key address of the first blockchain node, the second public key address, the first transaction content, and the encrypted fifth private key.

In some embodiments of this disclosure, the first blockchain node writes the second transaction information into the blockchain, that is, adds the second transaction information to the blockchain. The second transaction information includes a public key address of the first blockchain node, the second public key address (that is, a temporary public key address of the second blockchain node), the first transaction content, and the encrypted fifth private key. That is, a format of the second transaction information is that content of an Input field is the public key address of the first blockchain node (that is, a public key address of a transaction sender), content of an Output field is the second public key address of the second blockchain node (that is, a public key address of a transaction recipient), content of a transaction content field is the first transaction content and the encrypted fifth private key, and the transaction content field may be represented as (Txcontents, En(h, S)).

Further, the public key address of the first blockchain node belongs to the first blockchain node, the first transaction content is content of a transaction between the first blockchain node and the second blockchain node, the second transaction information written into the blockchain is verified by the second blockchain node based on the second public key address, the second public key address is generated based on the fifth private key, the encrypted fifth private key needs to be decrypted by using the shared key, and the shared key is generated at the second blockchain node by using the public key of the first blockchain node and the first private key of the second blockchain node.

606. The second blockchain node generates the shared key based on the public key of the first blockchain node and the first private key of the second blockchain node.

In this embodiment of this disclosure, a specific implementation of performing step 606 by the first blockchain node is similar to the specific implementation of step 305 in the embodiment corresponding to FIG. 3. For details, refer to the description in FIG. 5. Details are not described herein again.

607. The second blockchain node reads at least one piece of transaction information on the blockchain, determines whether the second transaction information exists in the at least one piece of transaction information on the blockchain, and if the second transaction information exists, determines that the transaction indicated by the first transaction content is a successful transaction; or if the second transaction information does not exist, determines that the transaction indicated by the first transaction content is a failed transaction.

In this embodiment of this disclosure, the second blockchain node needs to traverse all transaction information on each blockchain node, that is, needs to read each piece of transaction information on the blockchain, to determine one by one whether each piece of transaction information on the blockchain is the second transaction information, that is, determine whether the second transaction information exists in the at least one piece of transaction information on the blockchain. When the second transaction information exists in the at least one piece of transaction information on the blockchain, it is determined that the transaction indicated by the first transaction content is a successful transaction; or when the second transaction information does not exist in the at least one piece of transaction information on the blockchain, it is determined that the transaction indicated by the first transaction content is a failed transaction.

Each piece of transaction information on the blockchain node includes the public key address of the transaction sender (that is, content of the Input field), the public key address of the transaction recipient (that is, content of the Output field), content of the transaction between the transaction sender and the transaction recipient, and the encrypted fifth private key. The second transaction information includes the public key address of the first blockchain node, the second public key address of the second blockchain node, the first transaction content, and the encrypted fifth private key. The encrypted fifth private key can be decrypted by using the shared key generated by the second blockchain node, and the second public key address can be generated based on the fifth private key.

In this embodiment, in a process of determining whether any one of the at least one piece of transaction information on the blockchain is the second transaction information, after reading one piece of transaction information, the second blockchain node decrypts the encrypted key by using the generated shared key, generates a public key address based on a decryption result in the manner in step 603, and determines whether the generated public key address is the same as the public key address of the transaction recipient included in the obtained transaction information. If the generated public key address is the same as the public key address of the transaction recipient, it indicates that the read transaction information is the second transaction information; or if the generated public key address is different from the public key address of the transaction recipient, it indicates that the read transaction information is not the second transaction information.

The second blockchain node performs the foregoing operation on each piece of transaction information on the blockchain, to determine whether each piece of transaction information on the blockchain is the second transaction information.

608. The second blockchain node generates a sixth private key of the second blockchain node based on the fifth private key, where the sixth private key is used to spend a product in the second transaction information.

In this embodiment of this disclosure, when the second blockchain node determines that the transaction indicated by the second transaction information is a successful transaction, if the second blockchain node needs to spend the product in the second transaction information, the second blockchain node further needs to generate the temporary sixth private key used to spend the product in the second transaction information. The temporary sixth private key is corresponding to the temporary second public key address. That is, the sixth private key needs to be used to directly generate the temporary second public key address under the constraint of the elliptic curve public key cryptosystem or under the constraint of the discrete logarithm public key cryptosystem.

In this embodiment, the second blockchain node generates the temporary sixth private key of the second blockchain node based on the fifth private key and the third private key of the second blockchain node.

In this embodiment, in a case, step 608 may include: the second blockchain node generates the temporary sixth private key of the second blockchain node based on the temporary fifth private key and the third private key of the second blockchain node (that is, the long-term private key of the second blockchain node) in the elliptic curve public key cryptosystem. For a specific implementation, refer to the description in step 308 in the embodiment corresponding to FIG. 3. A difference lies in that the second private key in step 308 is replaced with the fifth private key in step 608. It should be noted that, in the elliptic curve public key cryptosystem, after dot product multiplication is performed on the generated temporary sixth private key and the generator G, a dot product multiplication result needs to be equal to the temporary fourth public key generated in step 603.

In another case, step 608 may include: the second blockchain node generates the temporary sixth private key of the second blockchain node based on the temporary fifth private key and the third private key of the second blockchain node (that is, the long-term private key of the second blockchain node) in the discrete logarithm public key cryptosystem. For a specific implementation, refer to the description in step 308 in the embodiment corresponding to FIG. 3. A difference lies in that the second private key in step 308 is replaced with the fifth private key in step 608. It should be noted that, in the discrete logarithm public key cryptosystem, after an exponential operation is performed on the generated temporary sixth private key and the generator G, a result of the exponential operation needs to be equal to the temporary fourth public key generated in step 603.

Figure 7:
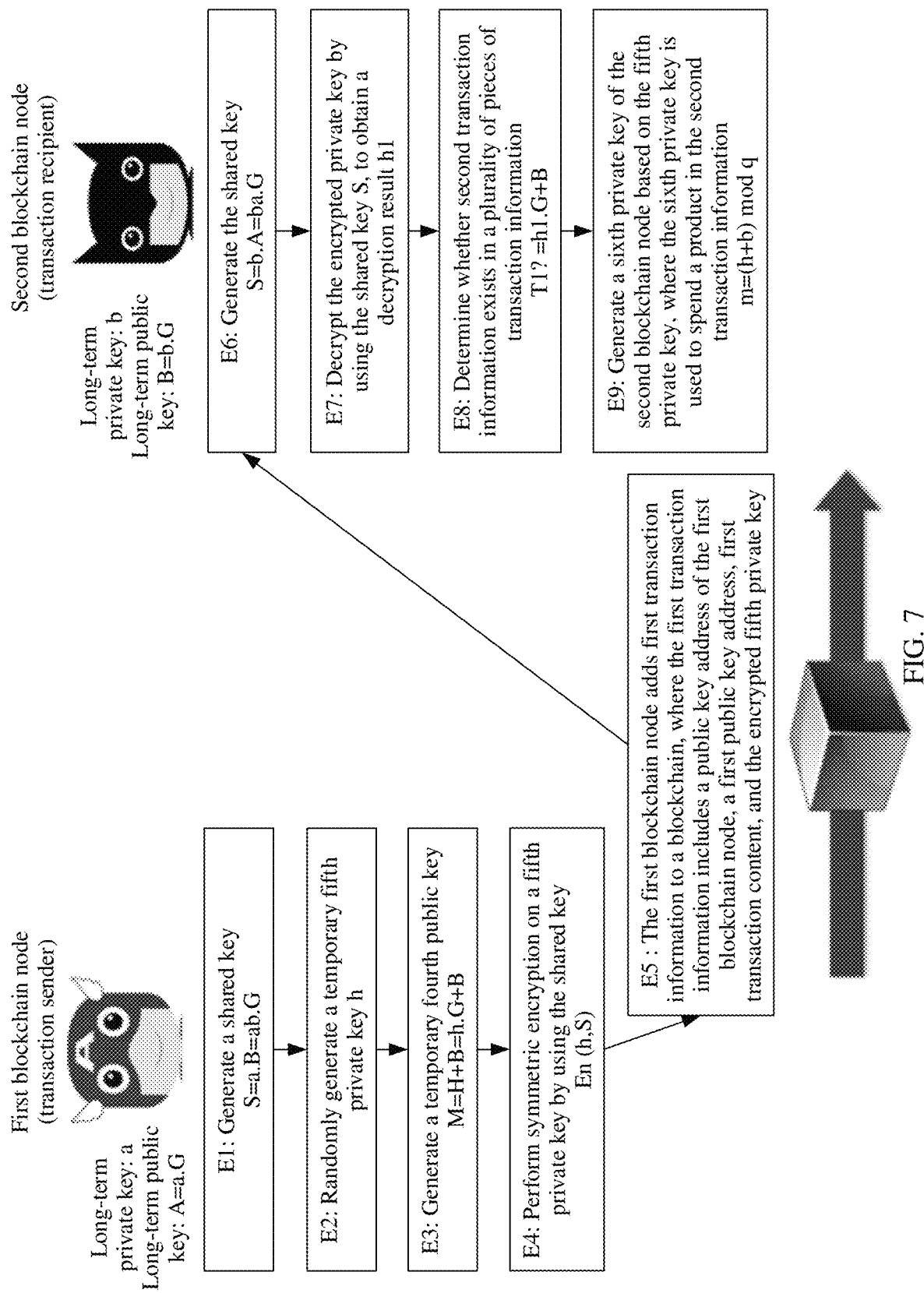
FIG. 7 is still another schematic flowchart of a blockchain information processing method according to an embodiment of this disclosure.
Figure 8:
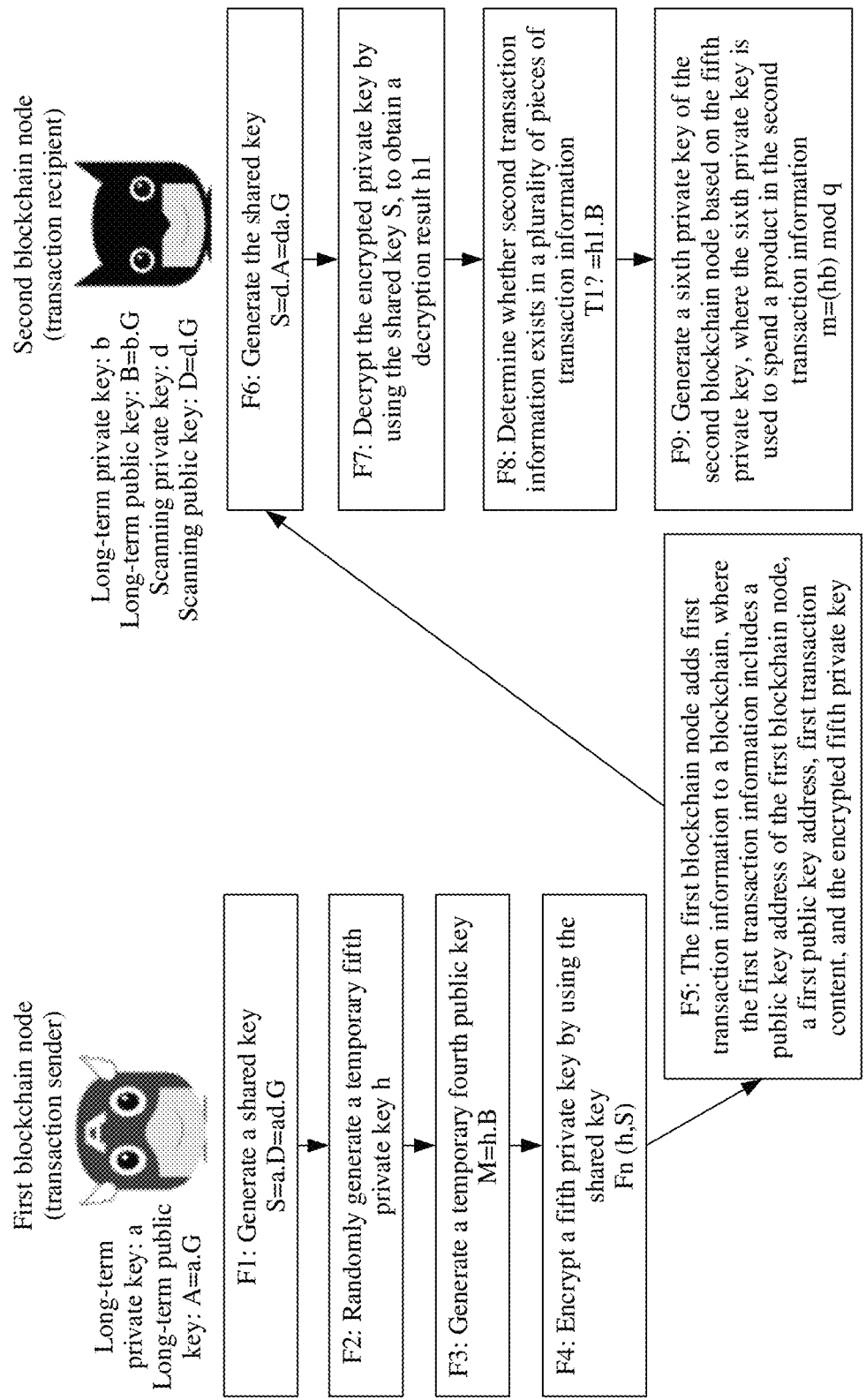
FIG. 8 is still another schematic flowchart of a blockchain information processing method according to an embodiment of this disclosure.

For a more intuitive understanding of this solution, refer to FIG. 7 and FIG. 8. FIG. 7 and FIG. 8 are two schematic flowcharts of the blockchain information processing methods according to the embodiments of this disclosure. In both FIG. 7 and FIG. 8, the elliptic curve public key cryptosystem is used as an example. A difference between FIG. 7 and FIG. 8 lies in that in FIG. 7, both the first blockchain node and the second blockchain node have only one set of fixed keys, while in FIG. 8, both the first blockchain node and the second blockchain node have two sets of fixed keys. First, refer to FIG. 7. A long-term private key a and a long-term public key A are configured in the first blockchain node, and a long-term private key b and a long-term public key B are configured in the second blockchain node. E1: The first blockchain node generates a shared key S by performing dot product multiplication on a and B. E2: The first blockchain node randomly generates a temporary fifth private key h. E3:

The first blockchain node performs dot product multiplication on h and G, and adds a dot product multiplication result to B, to generate a temporary third public key M, where the temporary third public key M is used to generate a temporary second public key address of the second blockchain node. E4: The first blockchain node performs symmetric encryption on the fifth private key by using the shared key, to obtain the encrypted fifth private key. E5: The first blockchain node adds second transaction information to a blockchain, where the second transaction information includes a public key address of the first blockchain node (that is, a public key address of a transaction sender), the temporary second public key address of the second blockchain node (that is, a public key address of a transaction recipient), first transaction content, and the encrypted fifth private key. E6: The second blockchain node generates the shared key S by performing dot product multiplication on b and A. E7: After reading one piece of transaction information on the blockchain, the second blockchain node decrypts, by using the shared key, an encrypted private key in the read transaction information, to obtain a decryption result h1. It should be noted that, if the currently read transaction information is the second transaction information, h1 is the same as h; or if the currently read transaction information is not the second transaction information, h1 is different from h. E8: The second blockchain node performs dot product multiplication on h1 and G, adds a dot product multiplication result to B to obtain an addition result, compares the addition result obtained through calculation with the public key address of the transaction recipient that is carried in the read transaction information, to determine whether the addition result obtained through calculation is the same as the read public key address of the transaction recipient. If the addition result obtained through calculation is the same as the read public key address of the transaction recipient, it indicates that the read transaction information is the second transaction information, that is, it indicates that the transaction indicated by the second transaction information succeeds; or if none of the transaction information on the blockchain is the second transaction information, it indicates that a transaction performed by using the second transaction information fails. E9: When the transaction indicated by the second transaction information succeeds, if the second blockchain node needs to spend a product in the second transaction information, the second blockchain node further generates a sixth private key of the second blockchain node based on the second private key, where the sixth private key is used to spend the product in the second transaction information, and after dot product multiplication is performed on m and G, a dot product multiplication result needs to be equal to M, that is, m=(h+b) mod q.

Still refer to FIG. 8. Differences between FIG. 8 and FIG. 7 lie in that: First, the second blockchain node in FIG. 8 is configured with a long-term private key b, a long-term public key B, a scanning private key d, and a scanning public key D. Correspondingly, in step F1, the first blockchain node generates the shared key S by performing dot product multiplication on a and D; and in step F6, the second blockchain node generates the shared key S by performing dot product multiplication on d and A. Second, in step F3, the first blockchain node performs dot product multiplication on h and B, to generate a temporary fourth public key M. Correspondingly, in step F8, the second blockchain node performs dot product multiplication on h1 and B, and determines whether a dot product multiplication result obtained through calculation is the same as the read public key address of the transaction recipient. In addition, in step F9, to ensure that a dot product multiplication result obtained by performing dot product multiplication on the sixth private key m and G is equal to the fourth public key M, m=(hb) mod q. For descriptions of the remaining steps in FIG. 8, refer to the description in FIG. 7. Details are not described herein again. It should be noted that the examples in FIG. 7 and FIG. 8 are merely intended to facilitate understanding of this solution, and are not intended to limit this solution.

In this embodiment of this disclosure, another implementation solution in which the transaction recipient does not need to store or manage a plurality of public-private key pairs is provided while ensuring that a real address of the transaction recipient is hidden, thereby improving implementation flexibility of this solution.

Figure 9:
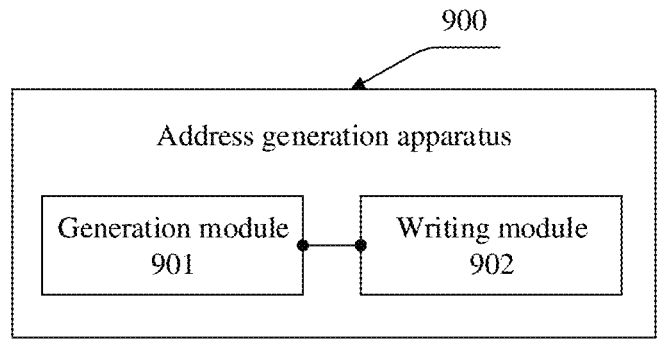
FIG. 9 is a schematic diagram of a structure of an address generation apparatus according to an embodiment of this disclosure.

Based on the embodiments corresponding to FIG. 1 to FIG. 8, to better implement the foregoing solutions in the embodiments of this disclosure, the following further provides related devices configured to implement the foregoing solutions. In this embodiment, refer to FIG. 9. FIG. 9 is a schematic diagram of a structure of an address generation apparatus according to an embodiment of this disclosure. The address generation apparatus 900 is applied to a first blockchain node. The address generation apparatus 900 includes a generation module 901 and a writing module 902. The generation module 901 is configured to generate a shared key based on a private key of the first blockchain node and a first public key of a second blockchain node. The generation module 901 is further configured to generate a first public key address of the second blockchain node based on the shared key and first transaction content. The writing module 902 is configured to write first transaction information into a blockchain, where the first transaction information includes a public key address of the first blockchain node, the first public key address, and the first transaction content. The first transaction content is content of a transaction between the first blockchain node and the second blockchain node, the first transaction information written into the blockchain is verified by the second blockchain node based on the first public key address, the first public key address needs to be verified by using the shared key, and the shared key is generated on the second blockchain node by using a public key of the first blockchain node and a first private key of the second blockchain node.

In a possible design, the generation module 901 is configured to: generate a second private key based on the shared key and the first transaction content, and generate the first public key address based on the second private key and a second public key of the second blockchain node.

In a possible design, the generation module 901 is configured to: combine the shared key and the first transaction content to obtain a first combination result, and perform a hash operation on the first combination result to generate the second private key.

In a possible design, the generation module 901 is configured to: generate a third public key based on the second private key and the second public key of the second blockchain node in an elliptic curve public key cryptosystem, and generate the first public key address based on the third public key; or generate a third public key based on the second private key and the second public key of the second blockchain node in a discrete logarithm public key cryptosystem, and generate the first public key address based on the third public key.

In a possible design, the generation module 901 is configured to perform either of the following two operations: performing dot product multiplication on the private key of the first blockchain node and the first public key of the second blockchain node in the elliptic curve public key cryptosystem, to obtain the shared key; or performing an exponential operation based on the private key of the first blockchain node and the first public key of the second blockchain node in the discrete logarithm public key cryptosystem, to obtain the shared key, where the first public key of the second blockchain node is a base in the exponential operation, and the private key of the first blockchain node is an exponent in the exponential operation.

In a possible design, both the first blockchain node and the second blockchain node have only one set of fixed keys, the set of fixed keys includes one long-term private key and one long-term public key, the private key of the first blockchain node is the long-term private key of the first blockchain node, the first public key of the second blockchain node is the long-term public key of the second blockchain node, the public key of the first blockchain node is the long-term public key of the first blockchain node, and the first private key of the second blockchain node is the long-term private key of the second blockchain node; or both the first blockchain node and the second blockchain node have two sets of fixed keys, the two sets of fixed keys include a first set of fixed keys and a second set of fixed keys, the first set of fixed keys includes one long-term private key and one long-term public key, the second set of fixed keys includes one scanning private key and one scanning public key, the private key of the first blockchain node is the long-term private key of the first blockchain node, the first public key of the second blockchain node is the scanning public key of the second blockchain node, the public key of the first blockchain node is the long-term public key of the first blockchain node, and the first private key of the second blockchain node is the scanning private key of the second blockchain node.

It should be noted that content such as information exchange and an execution process between the modules/units in the address generation apparatus 900 is based on a same idea as the method embodiments corresponding to FIG. 3 to FIG. 5 in this disclosure. For specific content, refer to the descriptions in the foregoing method embodiments in this disclosure. Details are not described herein again.

Figure 10:
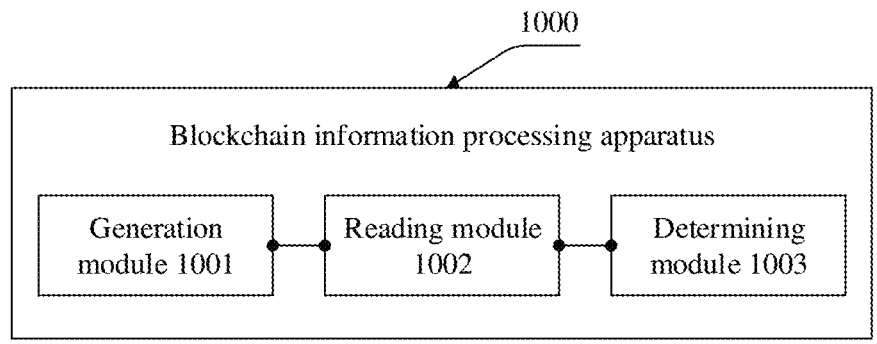
FIG. 10 is a schematic flowchart of a blockchain information processing apparatus according to an embodiment of this disclosure.

An embodiment of this disclosure further provides a blockchain information processing apparatus. FIG. 10 is a schematic diagram of a structure of the blockchain information processing apparatus according to this embodiment of this disclosure. The blockchain information processing apparatus 1000 is applied to a second blockchain node, and the blockchain information processing apparatus 1000 includes a generation module 1001, a reading module 1002, and a determining module 1003. The generation module 1001 is configured to generate a shared key based on a public key of a first blockchain node and a first private key of a second blockchain node. The reading module 1002 is configured to read at least one piece of transaction information on a blockchain. The determining module 1003 is configured to: when first transaction information exists in the at least one piece of transaction information, determine that a transaction indicated by first transaction content is a successful transaction, where the first transaction information includes a public key address of the first blockchain node, the first transaction content, and a first public key address of the second blockchain node. The public key address of the first blockchain node belongs to the first blockchain node, the first transaction content is content of a transaction between the first blockchain node and the second blockchain node, and the first public key address can be generated based on the shared key and the first transaction content.

In a possible design, the generation module 1001 is configured to perform dot product multiplication on the public key of the first blockchain node and the first private key of the second blockchain node in an elliptic curve public key cryptosystem, to obtain a shared key; or perform an exponential operation based on the public key of the first blockchain node and the first private key of the second blockchain node in a discrete logarithm public key cryptosystem, where the public key of the first blockchain node is a base in the exponential operation, and the first private key of the second blockchain node is an exponent in the exponential operation.

In a possible design, the generation module 1001 is further configured to generate a second private key based on the shared key and the first transaction content; and the generation module 1001 is further configured to generate a fourth private key of the second blockchain node based on the second private key and a third private key of the second blockchain node, where the fourth private key is used to spend a product in the first transaction information.

In a possible design, both the first blockchain node and the second blockchain node have only one set of fixed keys, the set of fixed keys includes one long-term private key and one long-term public key, the public key of the first blockchain node is the long-term public key of the first blockchain node, and the first private key of the second blockchain node is the long-term private key of the second blockchain node; or both the first blockchain node and the second blockchain node have two sets of fixed keys, the two sets of fixed keys include a first set of fixed keys and a second set of fixed keys, the first set of fixed keys includes one long-term private key and one long-term public key, the second set of fixed keys includes one scanning private key and one scanning public key, the public key of the first blockchain node is the long-term public key of the first blockchain node, and the first private key of the second blockchain node is the scanning private key of the second blockchain node.

It should be noted that content such as information exchange and an execution process between the modules/units in the blockchain information processing apparatus 1000 is based on a same idea as the method embodiments corresponding to FIG. 3 to FIG. 5 in this disclosure. For specific content, refer to the descriptions in the foregoing method embodiments in this disclosure. Details are not described herein again.

Figure 11:
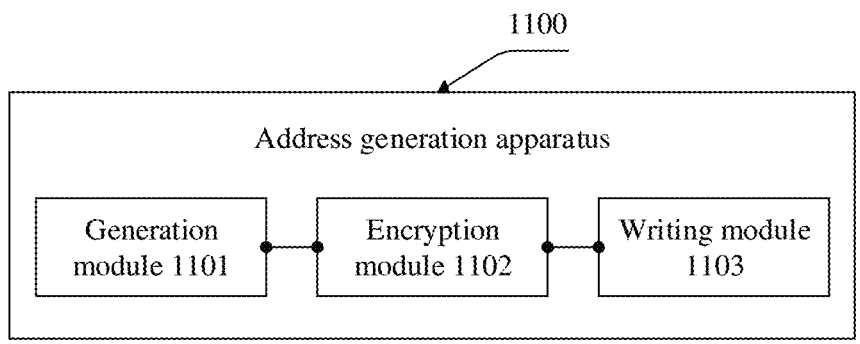
FIG. 11 is another schematic diagram of a structure of an address generation apparatus according to an embodiment of this disclosure.

An embodiment of this disclosure further provides an address generation apparatus. In this embodiment, refer to FIG. 11. FIG. 11 is a schematic diagram of a structure of the address generation apparatus according to this embodiment of this disclosure. The address generation apparatus 1100 is applied to a first blockchain node. The address generation apparatus 1100 includes a generation module 1101, an encryption module 1102, and a writing module 1103. The generation module 1101 is configured to generate a shared key based on a private key of the first blockchain node and a first public key of a second blockchain node. The generation module 1101 is further configured to randomly generate a fifth private key, and generate a second public key address of the second blockchain node based on the fifth private key. The encryption module 1102 is configured to perform symmetric encryption on the fifth private key by using the shared key, to obtain the encrypted fifth private key. The writing module 1103 is configured to write second transaction information into a blockchain, where the second transaction information includes a public key address of the first blockchain node, the second public key address, first transaction content, and the encrypted fifth private key. The public key address of the first blockchain node belongs to the first blockchain node, the first transaction content is content of a transaction between the first blockchain node and the second blockchain node, the second transaction information written into the blockchain is verified by the second blockchain node based on the second public key address, the second public key address is generated based on the fifth private key, the encrypted fifth private key needs to be decrypted by using the shared key, and the shared key is generated at the second blockchain node by using the public key of the first blockchain node and the first private key of the second blockchain node.

In a possible design, the generation module 1101 is configured to perform either of the following two operations: performing dot product multiplication on the private key of the first blockchain node and the first public key of the second blockchain node in the elliptic curve public key cryptosystem, to obtain the shared key; or performing an exponential operation based on the private key of the first blockchain node and the first public key of the second blockchain node in the discrete logarithm public key cryptosystem, where the first public key of the second blockchain node is a base in the exponential operation, and the private key of the first blockchain node is an exponent in the exponential operation.

In a possible design, the generation module 1101 is configured to generate the second public key address based on the fifth private key and the second public key of the second blockchain node.

It should be noted that content such as information exchange and an execution process between the modules/units in the address generation apparatus 1100 is based on a same idea as the method embodiments corresponding to FIG. 6 to FIG. 8 in this disclosure. For specific content, refer to the descriptions in the foregoing method embodiments in this disclosure. Details are not described herein again.

Figure 12:
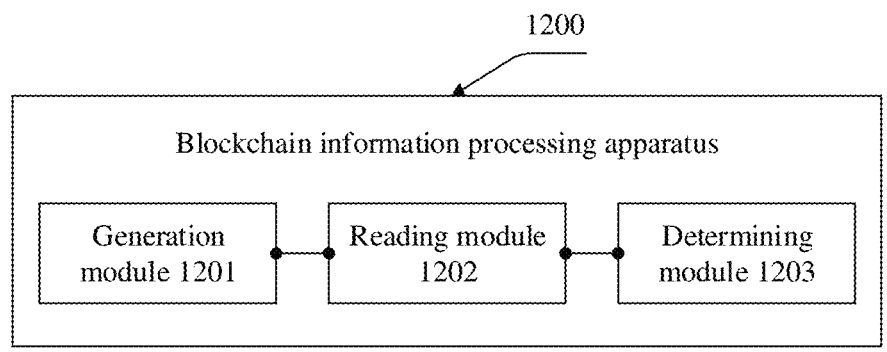
FIG. 12 is another schematic flowchart of a blockchain information processing apparatus according to an embodiment of this disclosure.

An embodiment of this disclosure further provides a blockchain information processing apparatus. FIG. 12 is a schematic diagram of a structure of the blockchain information processing apparatus according to this embodiment of this disclosure. The blockchain information processing apparatus 1200 is applied to a second blockchain node, and the blockchain information processing apparatus 1200 includes a generation module 1201, a reading module 1202, and a determining module 1203. The generation module 1201 is configured to generate a shared key based on a public key of a first blockchain node and a first private key of the second blockchain node. The reading module 1202 is configured to read at least one piece of transaction information on a blockchain. The determining module 1203 is configured to: when second transaction information exists in the at least one piece of transaction information, determine that a transaction indicated by the first transaction content is a successful transaction, where the second transaction information includes a public key address of the first blockchain node, a second public key address of the second blockchain node, the first transaction content, and an encrypted fifth private key. The public key address of the first blockchain node belongs to the first blockchain node, the first transaction content is content of a transaction between the first blockchain node and the second blockchain node, the encrypted fifth private key can be decrypted by using the shared key, and the second public key address can be generated based on the fifth private key.

In a possible design, the generation module 1201 is configured to perform either of the following two operations: performing dot product multiplication on the public key of the first blockchain node and the first private key of the second blockchain node in the elliptic curve public key cryptosystem, to obtain the shared key; or performing an exponential operation based on the public key of the first blockchain node and the first private key of the second blockchain node in the discrete logarithm public key cryptosystem, where the public key of the first blockchain node is a base in the exponential operation, and the first private key of the second blockchain node is an exponent in the exponential operation.

In a possible design, the generation module 1201 is further configured to generate a sixth private key of the second blockchain node based on the fifth private key and a third private key of the second blockchain node, where the sixth private key is used to spend a product in the second transaction information.

It should be noted that content such as information exchange and an execution process between the modules/units in the blockchain information processing apparatus 1200 is based on a same idea as the method embodiments corresponding to FIG. 6 to FIG. 8 in this disclosure. For specific content, refer to the descriptions in the foregoing method embodiments in this disclosure. Details are not described herein again.

Figure 13:
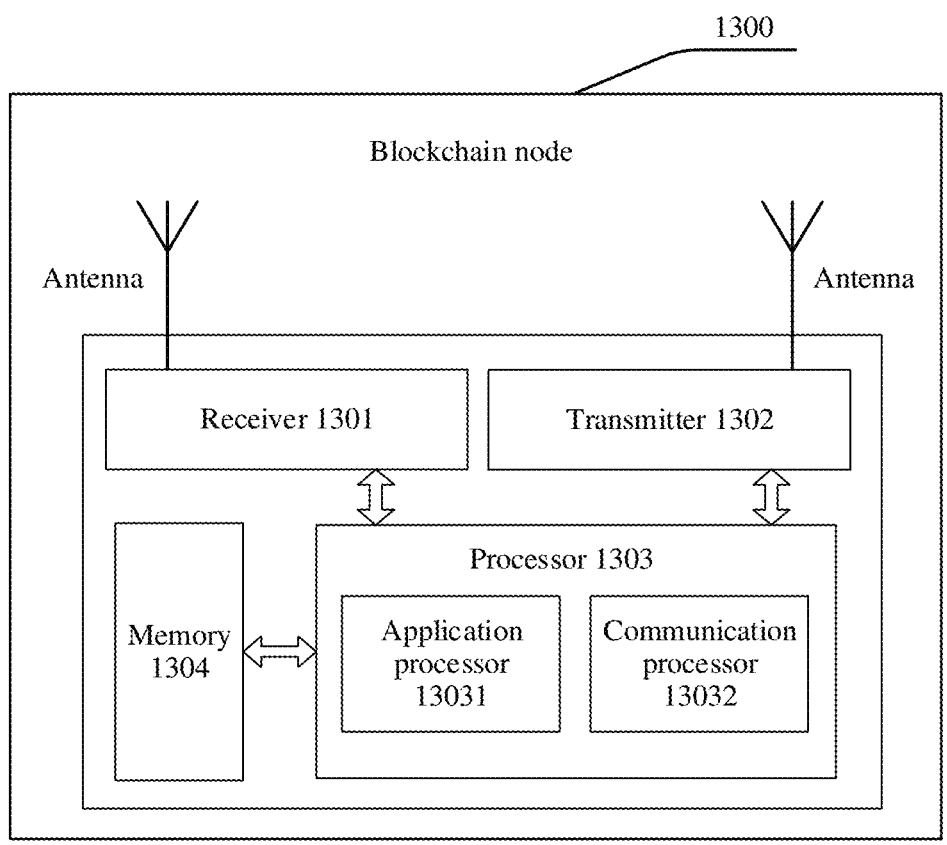
FIG. 13 is a schematic diagram of a structure of a blockchain node according to an embodiment of this disclosure.

An embodiment of this disclosure further provides a blockchain node. FIG. 13 is a schematic diagram of a structure of the blockchain node according to this embodiment of this disclosure. The first blockchain node described in the embodiments corresponding to FIG. 3 to FIG. 5 may be deployed on the blockchain node 1300, and is configured to implement the functions of the address generation apparatus 900 in the embodiment corresponding to FIG. 9. Alternatively, the second blockchain node described in the embodiments corresponding to FIG. 3 to FIG. 5 may be deployed on the blockchain node 1300, and is configured to implement the functions of the blockchain information processing apparatus 1000 in the embodiment corresponding to FIG. 10. Alternatively, the first blockchain node described in the embodiments corresponding to FIG. 6 to FIG. 8 may be deployed on the blockchain node 1300, and is configured to implement the functions of the address generation apparatus 1100 in the embodiment corresponding to FIG. 11. Alternatively, the second blockchain node described in the embodiments corresponding to FIG. 6 to FIG. 8 may be deployed on the blockchain node 1300, and is configured to implement the functions of the blockchain information processing apparatus 1200 in the embodiment corresponding to FIG. 12.

In this embodiment, the blockchain node 1300 includes a receiver 1301, a transmitter 1302, a processor 1303, and a memory 1304 (there may be one or more processors 1303 in the blockchain node 1300, and one processor is used as an example in FIG. 13). The processor 1303 may include an application processor 13031 and a communication processor 13032. In some embodiments of the embodiments of this disclosure, the receiver 1301, the transmitter 1302, the processor 1303, and the memory 1304 may be connected by using a bus or in another manner.

The memory 1304 may include a read-only memory and a random access memory, and provide instructions and data for the processor 1303. A part of the memory 1304 may further include a non-volatile random access memory (NVRAM). The memory 1304 stores a processor and operation instructions, an executable module or a data structure, a subnet thereof, or an extended set thereof. The operation instructions may include various operation instructions to implement various operations.

The processor 1303 controls an operation of a data generation apparatus. In specific application, components of the data transmission apparatus are coupled together through a bus system. In addition to a data bus, the bus system includes a power bus, a control bus, and a status signal bus. However, for clear description, various types of buses in the figure are marked as the bus system.

The methods disclosed in the embodiments of this disclosure may be applied to the processor 1303, or may be implemented by using the processor 1303. The processor 1303 may be an integrated circuit chip, and has a signal processing capability. In an implementation process, steps in the foregoing methods may be implemented by using a hardware integrated logical circuit in the processor 1303, or by using instructions in a form of software. The processor 1303 may be a general-purpose processor, a digital signal processor (DSP), a microprocessor, or a microcontroller; or may include an application-specific integrated circuit (ASIC), a field-programmable gate array (FPGA) or another programmable logic device, a discrete gate or transistor logic device, or a discrete hardware component. The processor 1303 may implement or perform the methods, steps, and logic block diagrams disclosed in the embodiments of this disclosure. The general-purpose processor may be a microprocessor, or the processor may be any conventional processor or the like. Steps of the methods disclosed with reference to embodiments of this disclosure may be directly executed and accomplished by means of a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1304, and the processor 1303 reads information in the memory 1304 and completes the steps in the foregoing methods in combination with hardware in the processor 1303.

The receiver 1301 may be configured to: receive input digit or character information, and generate signal inputs related to related settings and function control of the data generation apparatus. The transmitter 1302 may be configured to output digit or character information through a first interface. The transmitter 1302 may be further configured to send an instruction to a disk group through the first interface, so as to modify data in the disk group. The transmitter 1302 may further include a display device such as a display.

In this embodiment of this disclosure, in a case, the application processor 13031 is configured to implement functions of the first blockchain node in the embodiments corresponding to FIG. 3 to FIG. 5. For a specific implementation in which the application processor 13031 performs the functions of the first blockchain node in the embodiments corresponding to FIG. 3 to FIG. 5 and beneficial effects brought by the application processor 13031, refer to the descriptions in the method embodiments corresponding to FIG. 3 to FIG. 5. Details are not described herein again.

In another case, the application processor 13031 is configured to implement the functions of the second blockchain node in the embodiments corresponding to FIG. 3 to FIG. 5. For a specific implementation in which the application processor 13031 performs the functions of the second blockchain node in the embodiments corresponding to FIG. 3 to FIG. 5 and beneficial effects brought by the application processor 13031, refer to the descriptions in the method embodiments corresponding to FIG. 3 to FIG. 5. Details are not described herein again.

In a case, the application processor 13031 is configured to implement the functions of the first blockchain node in the embodiments corresponding to FIG. 6 to FIG. 8. For a specific implementation in which the application processor 13031 performs the functions of the first blockchain node in the embodiments corresponding to FIG. 6 to FIG. 8 and beneficial effects brought by the application processor 13031, refer to the descriptions in the method embodiments corresponding to FIG. 6 to FIG. 8. Details are not described herein again.

In another case, the application processor 13031 is configured to implement the functions of the second blockchain node in the embodiments corresponding to FIG. 6 to FIG. 8. For a specific implementation in which the application processor 13031 performs the functions of the second blockchain node in the embodiments corresponding to FIG. 6 to FIG. 8 and beneficial effects brought by the application processor 13031, refer to the descriptions in the method embodiments corresponding to FIG. 6 to FIG. 8. Details are not described herein again.

An embodiment of this disclosure further provides a computer-readable storage medium. The computer-readable storage medium stores a program. When the program is run on a computer, the computer is enabled to perform the steps performed by the first blockchain node in the methods described in the embodiments shown in FIG. 3 to FIG. 5, or perform the steps performed by the second blockchain node in the methods described in the embodiments shown in FIG. 3 to FIG. 5.

An embodiment of this disclosure further provides a computer-readable storage medium. The computer-readable storage medium stores a program. When the program is run on a computer, the computer is enabled to perform the steps performed by the first blockchain node in the methods described in the embodiments shown in FIG. 6 to FIG. 8, or perform the steps performed by the second blockchain node in the methods described in the embodiments shown in FIG. 6 to FIG. 8.

An embodiment of this disclosure further provides a computer program. When the computer program is run on a computer, the computer is enabled to perform the steps performed by the first blockchain node in the methods described in the embodiments shown in FIG. 3 to FIG. 5, or perform the steps performed by the second blockchain node in the methods described in the embodiments shown in FIG. 3 to FIG. 5.

An embodiment of this disclosure further provides a computer program. When the computer program is run on a computer, the computer is enabled to perform the steps performed by the first blockchain node in the methods described in the embodiments shown in FIG. 6 to FIG. 8, or perform the steps performed by the second blockchain node in the methods described in the embodiments shown in FIG. 6 to FIG. 8.

An embodiment of this disclosure further provides a circuit system. The circuit system includes a processing circuit. The processing circuit is configured to perform the steps performed by the first blockchain node in the methods described in the embodiments shown in FIG. 3 to FIG. 5, or perform the steps performed by the second blockchain node in the methods described in the embodiments shown in FIG. 3 to FIG. 5.

An embodiment of this disclosure further provides a circuit system. The circuit system includes a processing circuit. The processing circuit is configured to perform the steps performed by the first blockchain node in the methods described in the embodiments shown in FIG. 6 to FIG. 8, or perform the steps performed by the second blockchain node in the methods described in the embodiments shown in FIG. 6 to FIG. 8.

The related device provided in this embodiment of this disclosure may be a chip. The chip includes a processing unit and a communication unit. The processing unit may be, for example, a processor; and the communication unit may be, for example, an input/output interface, a pin, or a circuit. The processing unit may execute computer executable instructions stored in a storage unit, so that the chip performs the steps performed by the first blockchain node in the methods described in the embodiments shown in FIG. 3 to FIG. 5, or performs the steps performed by the second blockchain node in the methods described in the embodiments shown in FIG. 3 to FIG. 5, or performs the steps performed by the first blockchain node in the methods described in the embodiments shown in FIG. 6 to FIG. 8, or performs the steps performed by the second blockchain node in the methods described in the embodiments shown in FIG. 6 to FIG. 8. Optionally, the storage unit is a storage unit in the chip, for example, a register or a cache; or the storage unit may be a storage unit that is in the radio access device and that is located outside the chip, for example, a read-only memory (ROM), another type of static storage device that can store static information and instructions, or a random access memory (RAM).

The processor mentioned anywhere above may be a general-purpose central processing unit, a microprocessor, an ASIC, or one or more integrated circuits configured to control program execution of the methods.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of embodiments. In addition, in the accompanying drawings of the apparatus embodiments provided in this disclosure, a connection relationship between modules indicates that there is a communication connection between the modules, which may be implemented as one or more communication buses or signal cables.

Based on the description of the foregoing implementations, a person skilled in the art may clearly understand that this disclosure may be implemented by software in addition to necessary universal hardware, or certainly may be implemented by special-purpose hardware, including an application specific integrated circuit, a special-purpose CLU, a special-purpose memory, a special-purpose component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a special-purpose circuit. However, as for this disclosure, software program implementation is a better implementation in most cases. Based on such an understanding, the technical solutions of this disclosure essentially or the part contributing to the prior art may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, or a network device) to perform the methods described in embodiments of this disclosure.

All or some of the foregoing embodiments may be implemented by using software, hardware, firmware, or any combination thereof. When software is used to implement the embodiments, all or some of the embodiments may be implemented in a form of a computer program.

The computer program includes one or more computer instructions. When the computer program instructions are loaded and executed on the computer, the procedure or functions according to embodiments of this disclosure are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. An address generation method performed by a computer processor of a first blockchain node, and the method comprises:

generating a shared key based on a private key of the first blockchain node and a first public key of a second blockchain node;

generating a first public key address of the second blockchain node based on the shared key and first transaction content; and writing first transaction information into a blockchain, wherein the first transaction information comprises a public key address of the first blockchain node, the first public key address, and the first transaction content, wherein the first transaction content is content of a transaction between the first blockchain node and the second blockchain node, the first transaction information written into the blockchain is verifiable based on the first public key address, the first public key address is verifiable based on the shared key, and the shared key is generatable based on a public key of the first blockchain node and a first private key of the second blockchain node, and wherein the first blockchain node and the second blockchain node each has one set of fixed keys comprising one long-term private key and one long-term public key, wherein the private key of the first blockchain node is a long-term private key of the first blockchain node in the one set of fixed keys of the first blockchain node, the first public key of the second blockchain node is a long-term public key of the second blockchain node in the one set of fixed keys of the second blockchain node, the public key of the first blockchain node is a long-term public key of the first blockchain node in the one set of fixed keys of the first blockchain node, and the first private key of the second blockchain node is a long-term private key of the second blockchain node in the one set of fixed keys of the second blockchain node; or the first blockchain node and the second blockchain node each has two sets of fixed keys comprising a first set of fixed keys and a second set of fixed keys, the first set of fixed keys comprises one long-term private key and one long-term public key, the second set of fixed keys comprises one scanning private key and one scanning public key, the private key of the first blockchain node is a long-term private key of the first blockchain node in the first set of keys of the first blockchain node, the first public key of the second blockchain node is a scanning public key of the second blockchain node in the second set of keys of the second blockchain node, the public key of the first blockchain node is a long-term public key of the first blockchain node in the first set of keys of the first blockchain node, and the first private key of the second blockchain node is a scanning private key of the second blockchain node in the second set of keys of the second blockchain node.

2. The method according to claim 1, wherein the generating a first public key address of the second blockchain node based on the shared key and first transaction content comprises:
   generating a second private key based on the shared key and the first transaction content; and
   generating the first public key address based on the second private key and a second public key of the second blockchain node.

3. The method according to claim 2, wherein the generating a second private key based on the shared key and the first transaction content comprises:
   combining the shared key and the first transaction content to obtain a first combination result; and
   performing a hash operation on the first combination result to generate the second private key.

4. The method according to claim 2, wherein the generating the first public key address based on the second private key and a second public key of the second blockchain node comprises:
   generating a third public key based on the second private key and the second public key of the second blockchain node in an elliptic curve public key cryptosystem, and generating the first public key address based on the third public key; or
   generating a third public key based on the second private key and the second public key of the second blockchain node in a discrete logarithm public key cryptosystem, and generating the first public key address based on the third public key.

5. The method according to claim 1, wherein the generating a shared key based on a private key of the first blockchain node and a first public key of a second blockchain node comprises:
   performing dot product multiplication on the private key of the first blockchain node and the first public key of the second blockchain node in the elliptic curve public key cryptosystem, to obtain the shared key; or
   performing an exponential operation based on the private key of the first blockchain node and the first public key of the second blockchain node in the discrete logarithm public key cryptosystem, to obtain the shared key, wherein the first public key of the second blockchain node is a base in the exponential operation, and the private key of the first blockchain node is an exponent in the exponential operation.

6. A blockchain information processing method performed by a second blockchain node, and the method comprises:
   generating a shared key based on a public key of a first blockchain node and a first private key of the second blockchain node;
   reading at least one piece of transaction information on a blockchain; and
   when determining that first transaction information exists in the at least one piece of transaction information, determining that a transaction indicated by first transaction content is a successful transaction, wherein the first transaction information comprises a public key address of the first blockchain node, the first transaction content, and a first public key address of the second blockchain node, wherein
   the first transaction content is content of a transaction between the first blockchain node and the second blockchain node, and the first public key address is generated based on the shared key and the first transaction content, and wherein
   the first blockchain node and the second blockchain node each has one set of fixed keys comprising one long-term private key and one long-term public key, wherein the public key of the first blockchain node is a long-term public key of the first blockchain node in the one set of fixed keys of the first blockchain node, and the first private key of the second blockchain node is a long-term private key of the second blockchain node in the one set of fixed keys of the second blockchain node; or
   the first blockchain node and the second blockchain node each has two sets of fixed keys comprising a first set of fixed keys and a second set of fixed keys, the first set of fixed keys comprises one long-term private key and one long-term public key, the second set of fixed keys comprises one scanning private key and one scanning public key, the public key of the first blockchain node is a long-term public key of the first blockchain node in the first set of keys of the first blockchain node, and the first private key of the second blockchain node is a scanning private key of the second blockchain node in the second set of keys of the second blockchain node.

7. The method according to claim 6, wherein the generating a shared key based on a public key of a first blockchain node and a first private key of the second blockchain node comprises:
   performing dot product multiplication on the public key of the first blockchain node and the first private key of the second blockchain node in an elliptic curve public key cryptosystem to obtain the shared key; or
   performing an exponential operation based on the public key of the first blockchain node and the first private key of the second blockchain node in a discrete logarithm public key cryptosystem to obtain the shared key, wherein the public key of the first blockchain node is a base in the exponential operation, and the first private key of the second blockchain node is an exponent in the exponential operation.

8. The method according to claim 6, wherein the method further comprises:
   generating a second private key of the second blockchain node based on the shared key and the first transaction content;

generating a fourth private key of the second blockchain node based on the second private key and a third private key of the second blockchain node; and using the fourth private key to spend a product in the first transaction information.

9. A blockchain node, comprising:

a memory configured to store program instructions; and a processor, coupled with the memory, configured to execute the program instructions, wherein when the program instructions are executed by the processor, the blockchain node performs operations comprising:

generating a shared key based on a private key of the first blockchain node and a first public key of a second blockchain node;

generating a first public key address of the second blockchain node based on the shared key and first transaction content; and writing first transaction information into a blockchain, wherein the first transaction information comprises a public key address of the first blockchain node, the first public key address, and the first transaction content, wherein the first transaction content is content of a transaction between the first blockchain node and the second blockchain node, the first transaction information written into the blockchain is verifiable based on the first public key address, the first public key address is verifiable based on the shared key, and the shared key is generatable based on a public key of the first blockchain node and a first private key of the second blockchain node, wherein the generating a first public key address of the second blockchain node based on the shared key and first transaction content comprises:

generating a second private key based on the shared key and the first transaction content; and generating the first public key address based on the second private key and a second public key of the second blockchain node, and wherein the generating a second private key based on the shared key and the first transaction content comprises:

combining the shared key and the first transaction content, to obtain a first combination result; and performing a hash operation on the first combination result, to generate the second private key.

10. The blockchain node according to claim 9, wherein the generating the first public key address based on the second private key and a second public key of the second blockchain node comprises:

generating a third public key based on the second private key and the second public key of the second blockchain node in an elliptic curve public key cryptosystem, and generating the first public key address based on the third public key; or generating a third public key based on the second private key and the second public key of the second blockchain node in a discrete logarithm public key cryptosystem, and generating the first public key address based on the third public key.

11. The blockchain node according to claim 9, wherein the generating a shared key based on a private key of a first blockchain node and a first public key of a second blockchain node comprises:

performing dot product multiplication on the private key of the first blockchain node and the first public key of the second blockchain node in the elliptic curve public key cryptosystem, to obtain the shared key; or performing an exponential operation based on the private key of the first blockchain node and the first public key of the second blockchain node in the discrete logarithm public key cryptosystem, to obtain the shared key, wherein the first public key of the second blockchain node is a base in the exponential operation, and the private key of the first blockchain node is an exponent in the exponential operation.

12. The blockchain node according to claim 9, wherein the first blockchain node and the second blockchain node each has one set of fixed keys comprising one long-term private key and one long-term public key, wherein the private key of the first blockchain node is a long-term private key of the first blockchain node in the one set of fixed keys of the first blockchain node, the first public key of the second blockchain node is a long-term public key of the second blockchain node in the one set of fixed keys of the second blockchain node, the public key of the first blockchain node is the long-term public key of the first blockchain node in the one set of fixed keys of the first blockchain node, and the first private key of the second blockchain node is a long-term private key of the second blockchain node in the one set of fixed keys of the second blockchain node; or the first blockchain node and the second blockchain node each has two sets of fixed keys comprising a first set of fixed keys and a second set of fixed keys, the first set of fixed keys comprises one long-term private key and one long-term public key, the second set of fixed keys comprises one scanning private key and one scanning public key, the private key of the first blockchain node is a long-term private key of the first blockchain node in the first set of keys of the first blockchain node, the first public key of the second blockchain node is a scanning public key of the second blockchain node in the second set of keys of the second blockchain node, the public key of the first blockchain node is a long-term public key of the first blockchain node in the first set of keys of the first blockchain node, and the first private key of the second blockchain node is a scanning private key of the second blockchain node in the second set of keys of the second blockchain node.

\* \* \* \* \*